United States Patent
Sekikawa et al.

(10) Patent No.: US 9,825,513 B2
(45) Date of Patent: Nov. 21, 2017

(54) RECTANGULAR WIRE STATOR COIL MANUFACTURING METHOD

(71) Applicant: NISSAN MOTOR CO., LTD., Yokohama-shi, Kanagawa (JP)

(72) Inventors: Takashi Sekikawa, Kanagawa (JP); Kimio Nishimura, Kanagawa (JP); Masahiro Omata, Kanagawa (JP); Yasushi Matsushita, Kanagawa (JP); Min Wu, Kanagawa (JP); Takumi Ohshima, Kanagawa (JP); Hiroaki Shibukawa, Kanagawa (JP); Koji Higaki, Kanagawa (JP); Kunitomo Ishiguro, Kanagawa (JP); Yuhei Yamane, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/316,564

(22) PCT Filed: Jun. 9, 2014

(86) PCT No.: PCT/JP2014/065276
§ 371 (c)(1),
(2) Date: Dec. 6, 2016

(87) PCT Pub. No.: WO2015/189905
PCT Pub. Date: Dec. 17, 2015

(65) Prior Publication Data
US 2017/0187271 A1    Jun. 29, 2017

(51) Int. Cl.
*H02K 15/00* (2006.01)
*H02K 15/085* (2006.01)
(Continued)

(52) U.S. Cl.
CPC ............ *H02K 15/085* (2013.01); *H02K 3/12* (2013.01); *H02K 15/0081* (2013.01); *H02K 15/0421* (2013.01); *H02K 15/064* (2013.01)

(58) Field of Classification Search
CPC .... H02K 1/16; H02K 1/276; H02K 3/50; H02K 15/026; H02K 21/14; H02K 2213/12
See application file for complete search history.

(56) References Cited

U.S. PATENT DOCUMENTS

| | | | |
|---|---|---|---|
| 5,773,905 A | 6/1998 | Hill | |
| 6,414,410 B1 * | 7/2002 | Nakamura | H02K 3/12 310/179 |

(Continued)

FOREIGN PATENT DOCUMENTS

| | | |
|---|---|---|
| EP | 1 328 059 A2 | 7/2003 |
| EP | 1 638 188 A1 | 3/2006 |

(Continued)

*Primary Examiner* — Minh Trinh
(74) *Attorney, Agent, or Firm* — Foley & Lardner LLP

(57) ABSTRACT

A rectangular wire is wound on a stator core having a plurality of teeth and a plurality of slots. A plurality of rectangular wire elements is provided by cutting a rectangular wire into a predetermined length and bending into a substantial U-shape. A plurality of rectangular wire pieces configured to form a coil by connecting predetermined end portions of the rectangular wire elements is molded as a sub-assembly. Each of the plurality of the rectangular wire elements is inserted into a predetermined pair of the slots from a first end face of the stator core such that the respective end portions of the rectangular wire elements project from a second end face of the stator core. The rectangular wire pieces of the sub-assembly are fixed to the end portions of the rectangular wire elements, thereby manufacturing a stator coil having compact coil ends easily.

10 Claims, 23 Drawing Sheets

(51) Int. Cl.
*H02K 3/12* (2006.01)
*H02K 15/04* (2006.01)
*H02K 15/06* (2006.01)

(56) References Cited

U.S. PATENT DOCUMENTS

| | | | |
|---|---|---|---|
| 7,788,790 B2 * | 9/2010 | Neet | H02K 3/345 |
| | | | 29/596 |
| 2001/0010442 A1 | 8/2001 | Yasuhara et al. | |
| 2008/0136284 A1 | 6/2008 | Fujii et al. | |
| 2010/0038981 A1 | 2/2010 | Urano et al. | |
| 2010/0148620 A1 | 6/2010 | Ishizuka et al. | |
| 2012/0038230 A1 * | 2/2012 | Kurahara | H02K 1/165 |
| | | | 310/71 |
| 2012/0200191 A1 * | 8/2012 | Baba | H02K 3/12 |
| | | | 310/201 |
| 2013/0026874 A1 | 1/2013 | Kondou et al. | |
| 2016/0276887 A1 * | 9/2016 | Watanabe | H02K 3/50 |

FOREIGN PATENT DOCUMENTS

| | | |
|---|---|---|
| JP | H05-300687 A | 11/1993 |
| JP | 2000-152545 A | 5/2000 |
| JP | 2001-292548 A | 10/2001 |
| JP | 2002-369428 A | 12/2002 |
| JP | 2006-158044 A | 6/2006 |
| JP | 2010-045909 A | 2/2010 |
| JP | 2010-68590 A | 3/2010 |
| JP | 2010-166803 A | 7/2010 |
| JP | 2011-217444 A | 10/2011 |
| JP | 2012-110077 A | 6/2012 |
| JP | 2012-125043 A | 6/2012 |
| KR | 10-2013-0130519 A | 12/2013 |

\* cited by examiner

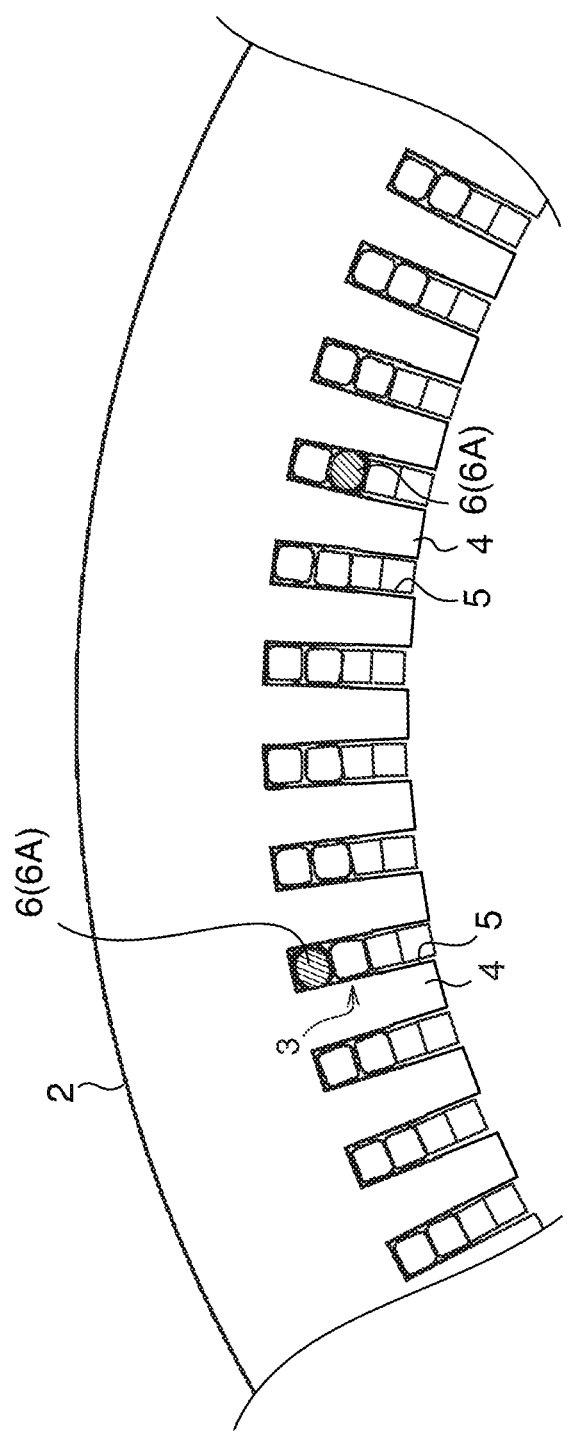

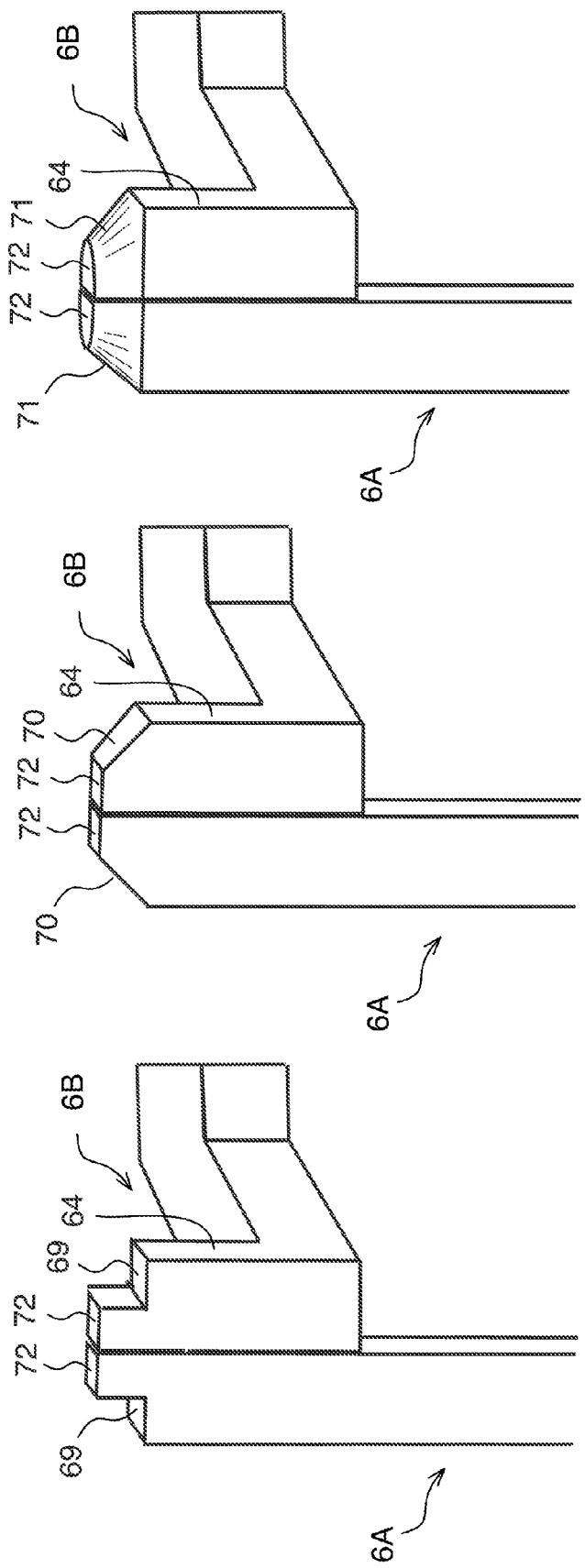

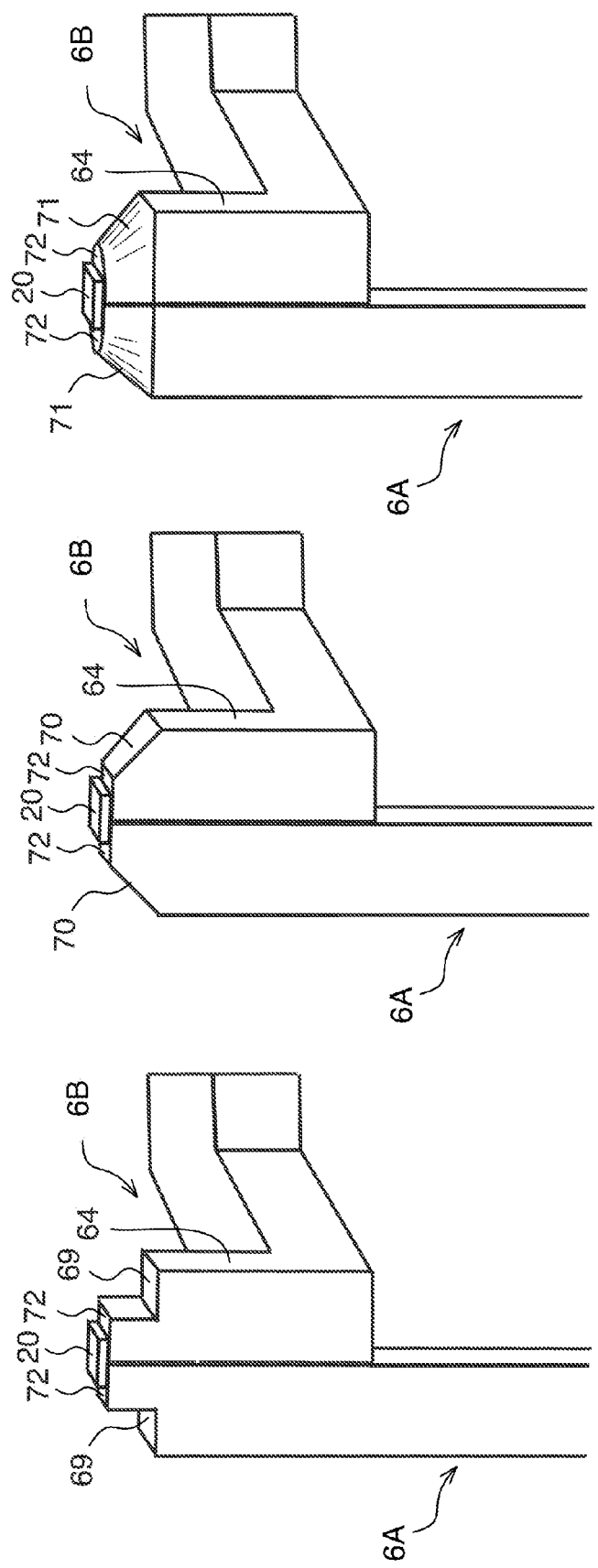

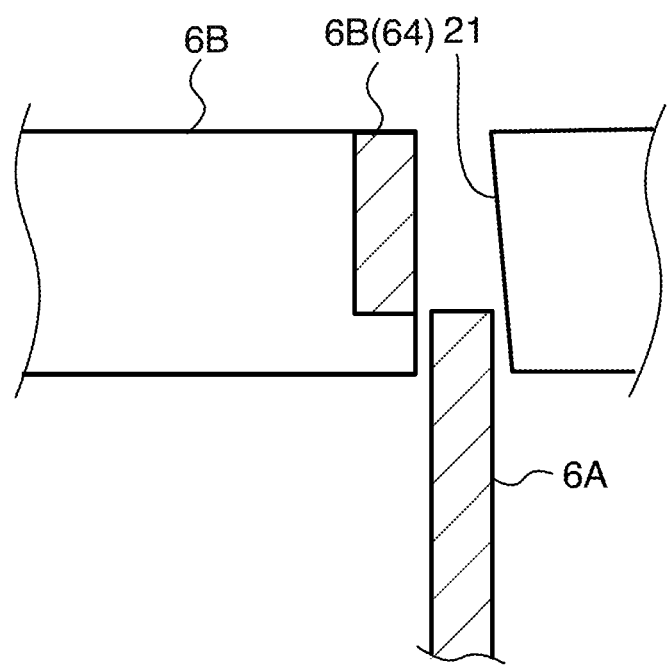
FIIG. 25

RECTANGULAR WIRE STATOR COIL MANUFACTURING METHOD

TECHNICAL FIELD

This invention relates to a method of manufacturing a rectangular wire stator coil used in an electric motor or the like.

BACKGROUND ART

A stator coil of an electric motor or the like is wound around a cylindrical stator core. A plurality of teeth is provided at equal angular intervals on an inner periphery of the stator core. Slots are formed respectively between adjacent teeth. A wire forming the coil is wound around the teeth through a pair of slots formed on either side of one or a plurality of teeth.

A coil end of the wire wound around the teeth projects in an axial direction from an end face of the stator core between the pair of slots. When the wire is wound across a plurality of teeth rather than a single tooth, or in other words when an extra slot exists between the pair of slots through which the wire is passed, the coil crosses a coil passed through the extra slot in a motor axis direction. The coils cross at the coil ends. The number of crossed portions differs according to the pitch of the coil windings, or in other words the number of teeth across which the coils are wound, such that the number of crossed portions increases in accordance with the pitch of the windings.

When the coil ends are crossed, a length by which the coil ends project in the axial direction from an end face of the stator core increases, and to suppress the length by which the coil ends project in the axial direction, lead wires of the crossed coil ends are conventionally woven into a mesh form, for example.

With this method, the wires forming the coils are woven one at a time, leading to an inevitable increase in the complexity of a coil winding operation. To facilitate the winding operation, JP2010-166803A, published by the Japan Patent Office in 2010, proposes winding the coils by fitting a wire assembly, which is formed by gathering together a plurality of wires in a coil shape, into a pair of slots, and forming an axial direction step in advance on a coil end of the wire assembly by providing a crank portion on the coil end.

In this conventional technique, coil ends can be crossed easily by passing a lead wire assembly of an adjacent coil through a space formed between the coil and the end face of the stator core by the step provided on the coil end.

SUMMARY OF INVENTION

Likewise with this conventional technique, however, the length by which the coil ends project in the axial direction inevitably increases as the number of crossed portions between coils, or in other words the pitch of the windings, increases.

Moreover, although the crossed portions can be processed more easily by forming the step, the operation to wind the pre-formed wires around the teeth of the stator core remains burdensome.

It is therefore an object of this invention to suppress an increase in the length by which a coil end of a stator coil winding projects in an axial direction, and to reduce a number of man-hours required for a coil winding operation.

In order to achieve the above object this invention is directed to a rectangular wire stator coil manufacturing method for winding a rectangular wire on a stator core. The stator core has a first end face, a second end face, a plurality of teeth extending between the first end face and the second end face, and a plurality of slots each of which is formed between adjacent teeth.

The method comprises forming in advance a plurality of rectangular wire elements by cutting the rectangular wire to a predetermined length and bending into a substantial U-shape, forming in advance a plurality of rectangular wire pieces configured to connect predetermined pairs of ends of the rectangular wire elements as a sub-assembly, inserting each of the rectangular wire elements into each predetermined pair of the slots of the stator core from the first end face and causing the end portions of the rectangular wire elements to project form the second end face, and fitting the sub-assembly to the second end face by fixing the rectangular wire pieces to the predetermined pairs of the end portions of the rectangular wire elements that project from the second end face.

The details as well as other features and advantages of this invention are set forth in the remainder of the specification and are shown in the accompanying drawings.

BRIEF DESCRIPTION OF DRAWINGS

FIG. 2 is a cross-sectional view of main parts of a rectangular wire stator coil.

FIGS. 20A-20C are perspective views of the connecting portion between the rectangular wire element and the rectangular wire piece, illustrating variation in the tip end shapes of the rectangular wire element in the rectangular wire piece.

FIGS. 21A-21C are perspective views of the connecting portion between the rectangular wire element and the rectangular wire piece, illustrating a positional relationship to a joint portion.

FIG. 25 is a longitudinal sectional view of main parts of the sub-assembly, illustrating variation in the shape of a gap formed in the sub-assembly.

DESCRIPTION OF EMBODIMENTS

Referring to FIGS. 1A and 1B, FIGS. 2-7, and FIG. 12 of the drawings, a basic structure of a rectangular wire stator coil to which this invention is applied will now be described.

Figure 1B:
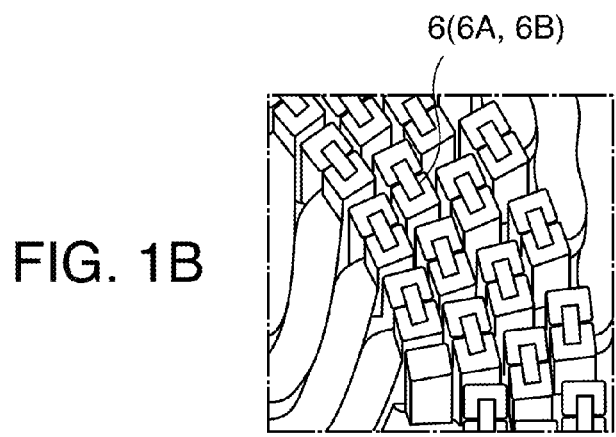
FIGS. 1A and 1B are respectively a perspective view of a stator coil manufactured by a rectangular wire stator coil manufacturing method according to a first embodiment of this invention, and an enlarged perspective view of main parts thereof.
Figure 1A:
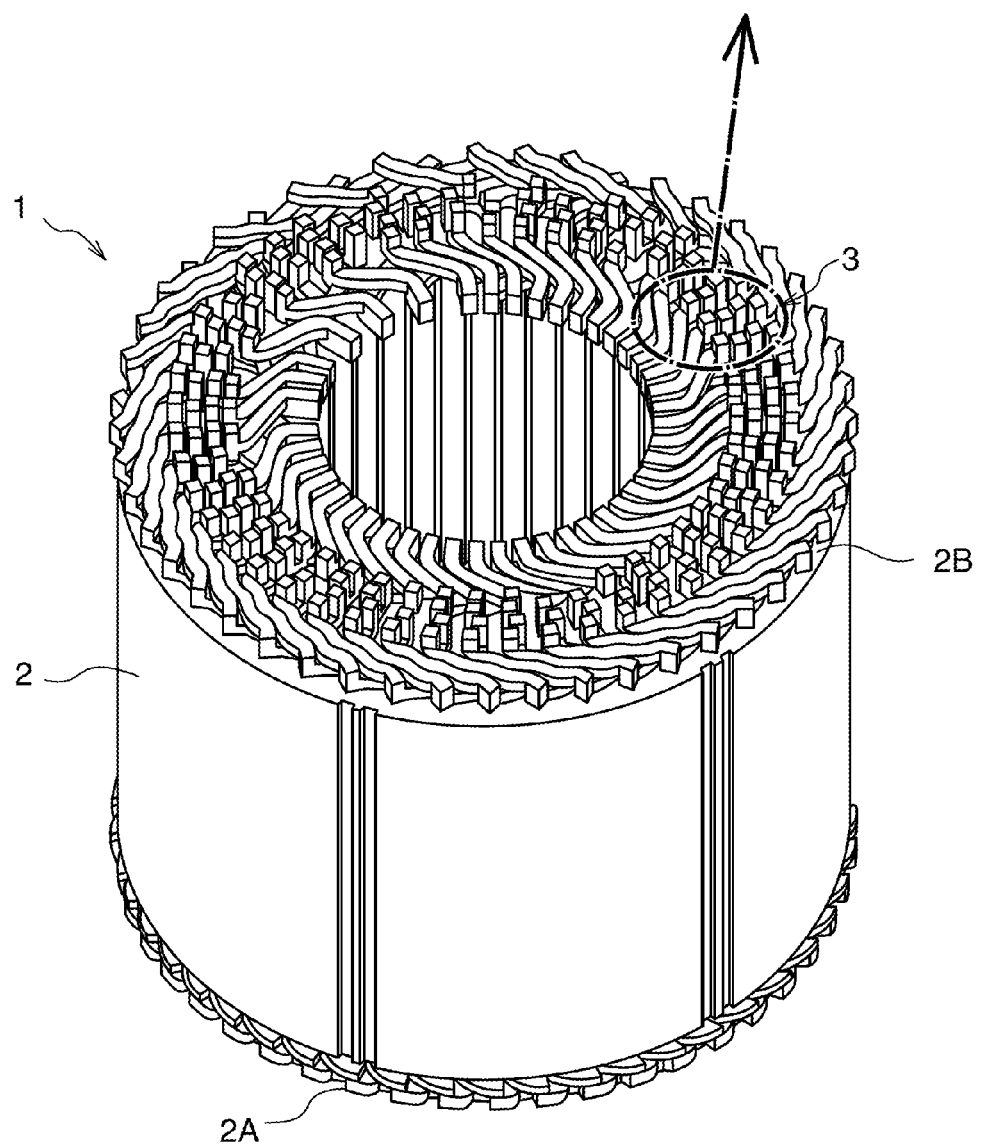

Referring to FIGS. 1A and 1B, a stator 1 used in an electric motor or the like includes a plurality of groups of coils 3 formed by winding rectangular wire 6 on a cylindrical stator core 2. The rectangular wire 6 is constituted by a lead wire formed by coating an outer periphery of copper wire with an insulating material.

Figure 12:
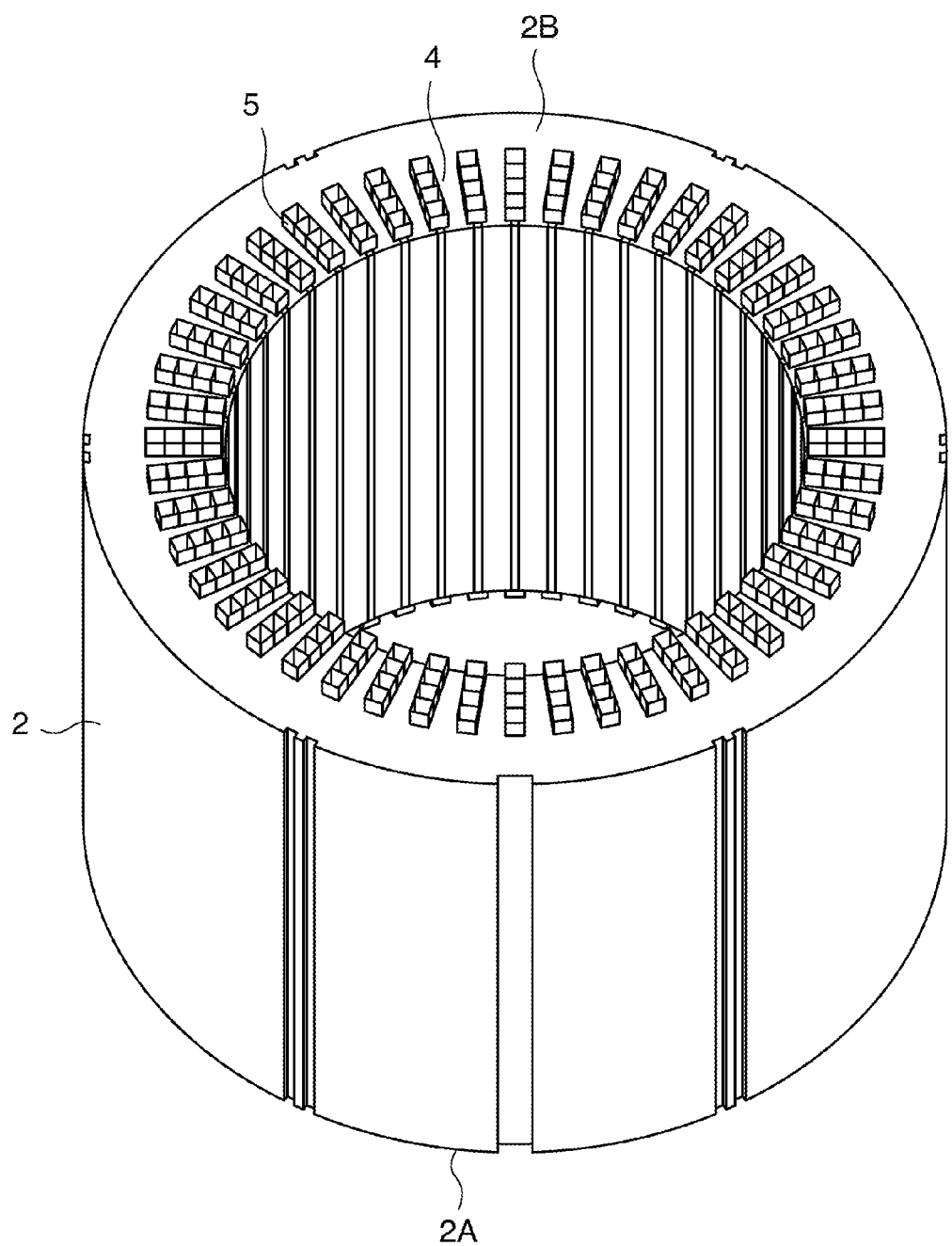
FIG. 12 is a perspective view of the stator core.

Referring to FIG. 12, the stator core 2 includes a first end face 2A and a second end face 2B oriented in an axial direction. Teeth 4 are formed at equal angular intervals on an inner periphery of the stator core 2. Slots 5 into which the rectangular wire 6 is inserted are formed between the teeth 4. The slots 5 open respectively onto the inner peripheral surface of the stator core 2, the first end face 2A, and the second end face 2B.

Referring to FIG. 2, each coil 3 is formed by winding the rectangular wire 6 four times through a pair of slots 5 straddling five of the teeth 4, as shown by shading in the figure. The rectangular wire 6 is wound thus through all of the pairs of slots 5 straddling five of the teeth 4. In the following description, the plurality of groups of coils 3 mounted on the stator core 2 will be referred to together as a stator coil.

Figure 3:
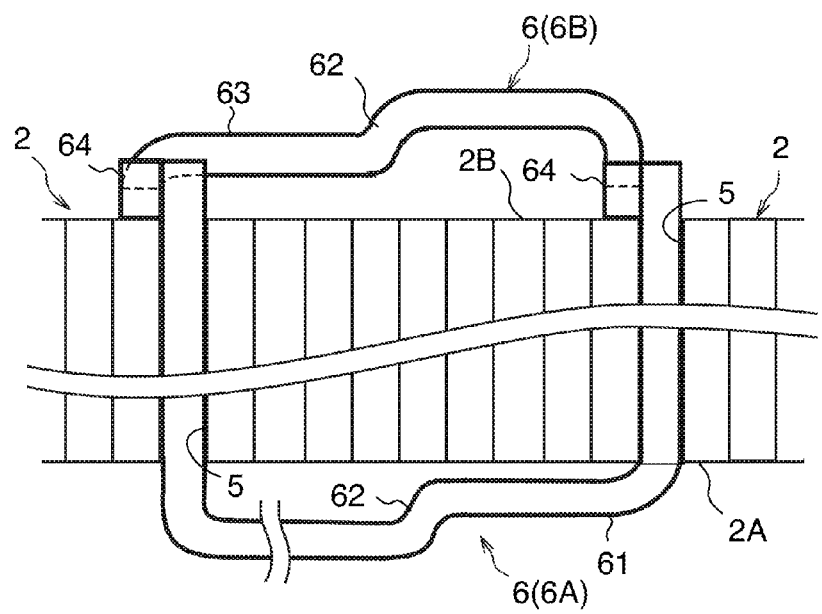
FIG. 3 is a side view of main parts of a rectangular wire element and a rectangular wire piece forming the rectangular wire stator coil, as seen from a center of a stator core.

Referring to FIG. 3, the rectangular wire 6 forming each coil 3 is constituted by a rectangular wire element 6A that passes through a predetermined pair of the slots 5 in the stator core 2 from the first end face 2A toward the second end face 2B, and a rectangular wire piece 6B fixed to end portions of the rectangular wire element 6A projecting axially outward from the second end face 2B.

Figure 5:
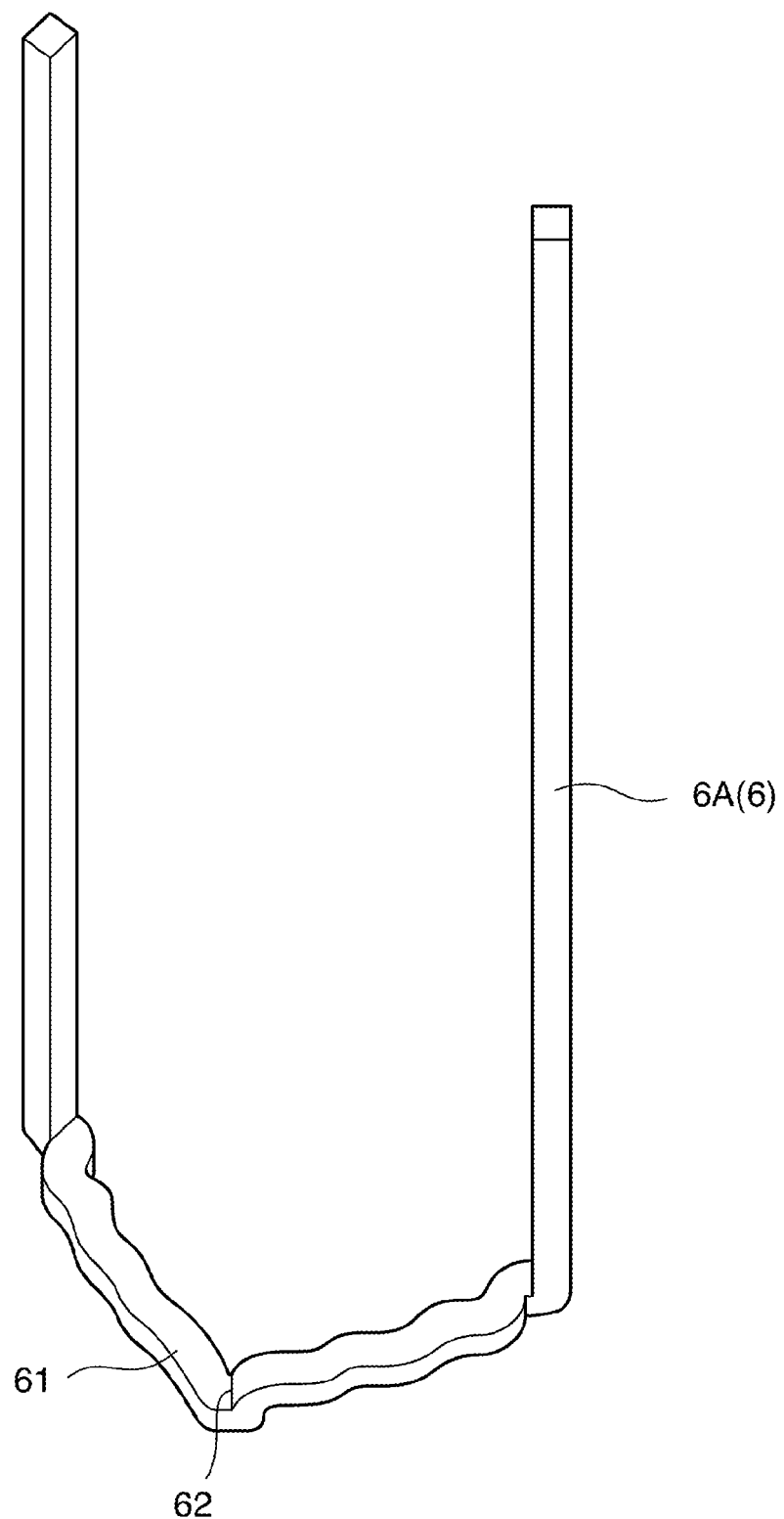
FIG. 5 is a perspective view of an outer side rectangular wire element.

Referring to FIG. 5, the rectangular wire element 6A is formed by cutting the rectangular wire 6 to a predetermined dimension in advance, and bending the cut rectangular wire 6 into a substantial U-shape using a bending device or the like. A site corresponding to a bottom portion of the U-shape is bent to a substantial right angle. When the rectangular wire element 6A is passed through the stator core 2, a bent portion 61 thus formed is parallel to the first end face 2A.

Referring back to FIG. 3, the rectangular wire element 6A is inserted into a predetermined pair of the slots 5 from the first end face 2A. As described above, the rectangular wire 6 is wound four times through each pair of slots 5, and therefore four rectangular wire elements 6A are inserted into each pair of slots 5.

Figure 6:
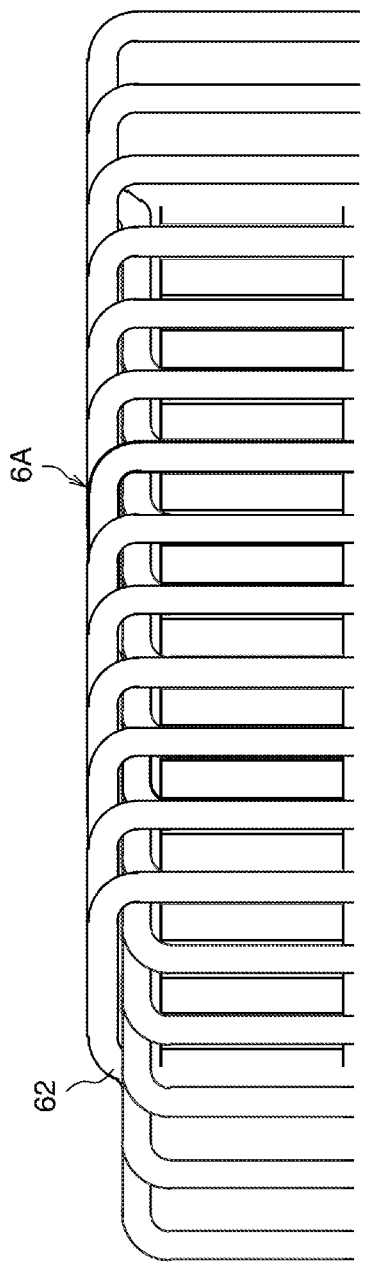
FIG. 6 is a side view of main parts of a single row of rectangular wire elements inserted into the stator core, as seen from the center of the stator core.
Figure 7:
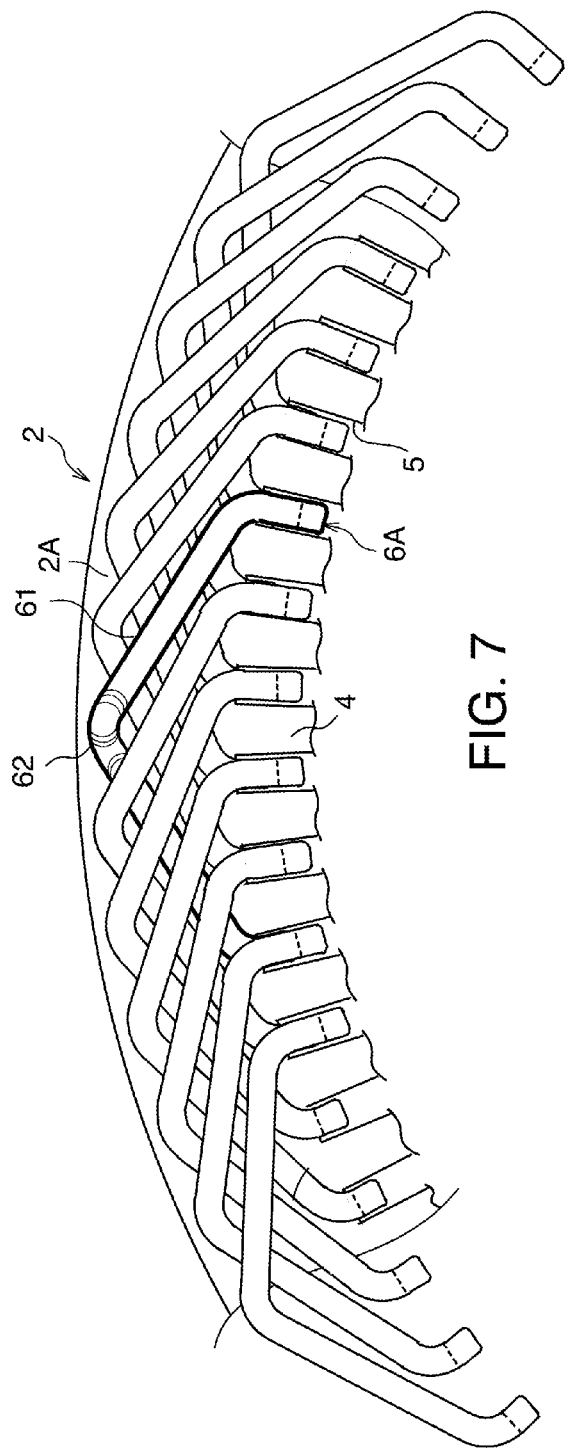
FIG. 7 is a front view of main parts of a single row of rectangular wire elements inserted into the stator core, as seen from the axial direction of the stator core.
Figure 8:
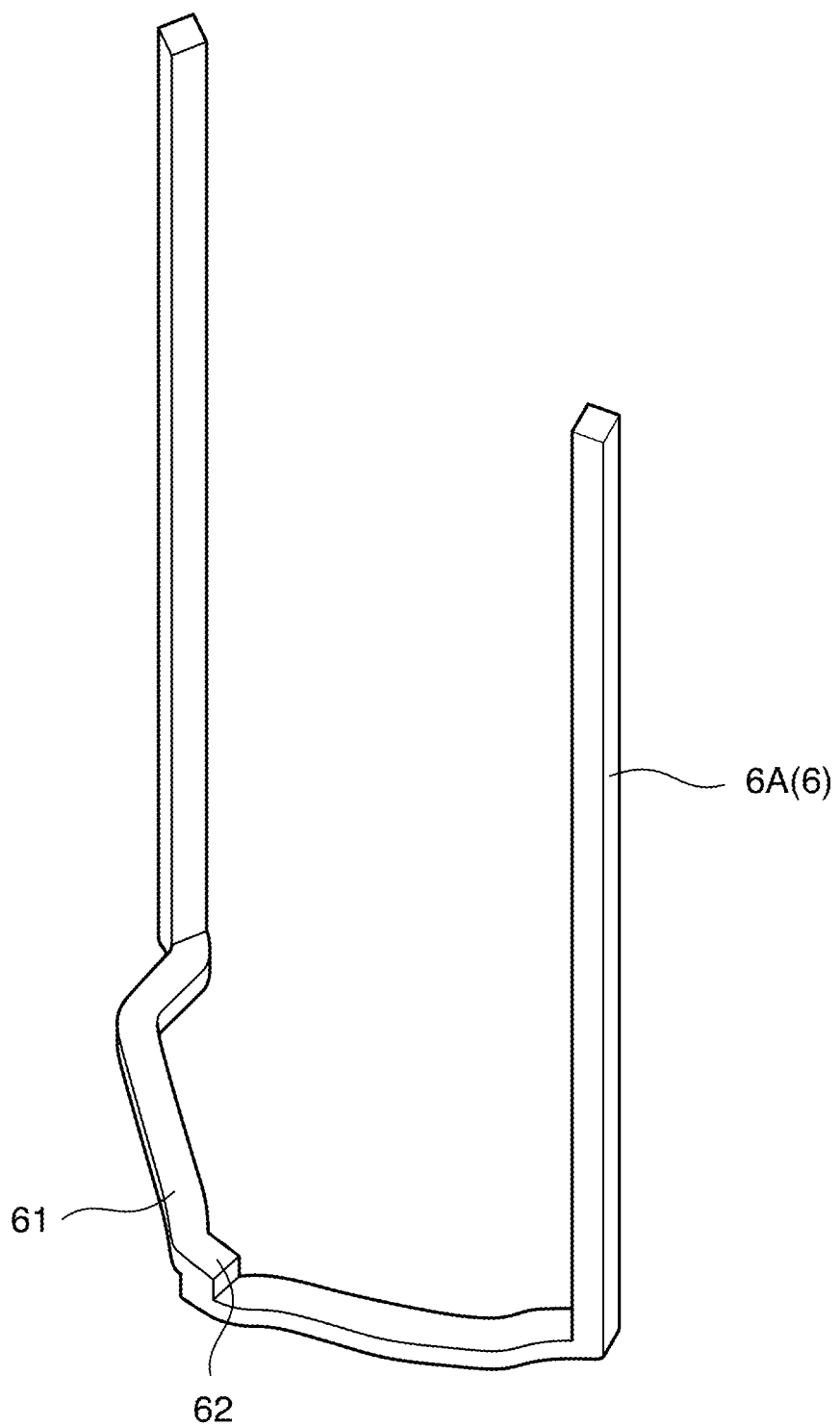
FIG. 8 is a perspective view of an inner side rectangular wire element.

Referring to FIGS. 6 and 7, on the first end face 2A, the bent portion 61 of the rectangular wire element 6A overlaps the bent portion 61 of another rectangular wire element 6A in a motor axis direction. To facilitate overlapping, a step 62 is formed in the bent portion 61. It should be noted that FIGS. 6 and 7 show only one row of rectangular wire elements 6A arranged in a circumferential direction on an outermost peripheral side, whereas in actuality, four rectangular wire elements 6A are disposed in each pair of slots 5 so as to overlap in a radial direction.

Figure 4:
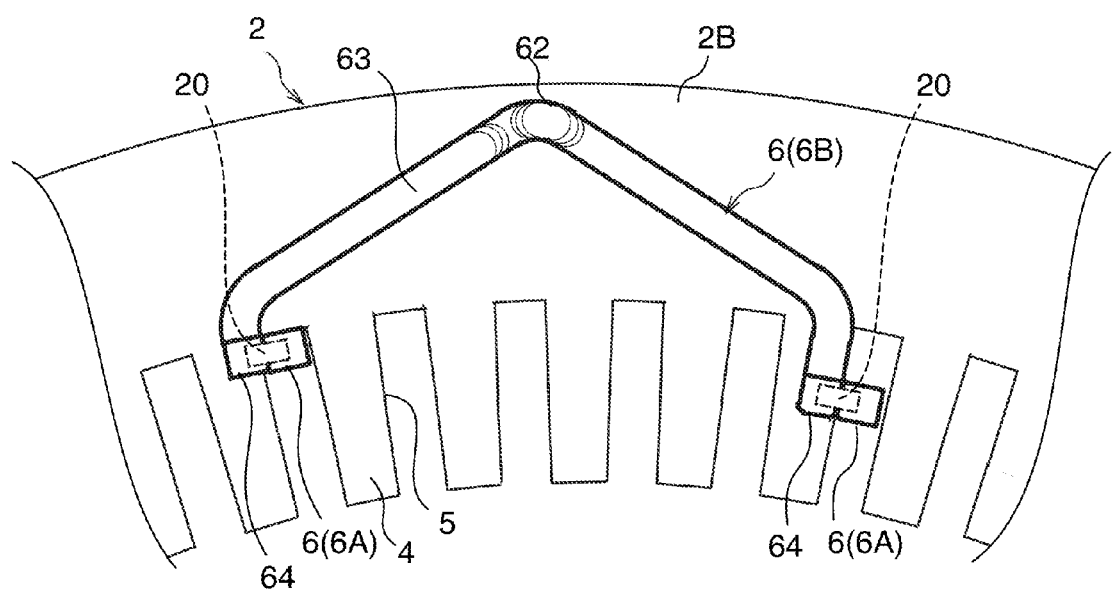
FIG. 4 is a front view of main parts of the rectangular wire element and the rectangular wire piece as seen from an axial direction of the stator core.

Referring to FIG. 4, the rectangular wire piece 6B is fixed to the rectangular wire element 6A passed through the slots 5 in the stator core 2 such that the respective end portions thereof project in the axial direction from the end face 2B.

The rectangular wire piece 6B is formed by cutting the rectangular wire 6 to a short length. The rectangular wire piece 6B includes a bent portion 63 that is similar to the bent portion 61 of the rectangular wire element 6A, and tip ends 64 extending in a right angle direction from respective ends of the bent portion 63. A similar step 62 to that of the bent portion 61 is formed in the bent portion 63. When the bent portion 63 of the rectangular wire piece 6B is disposed parallel to the second end face of the stator core 2, the two tip ends 64 of the rectangular wire piece 6B are parallel to the end portions of the rectangular wire element 6A.

The tip ends 64 of the rectangular wire piece 6B thus formed are held such that side faces thereof contact side faces of the end portions of the rectangular wire element 6A in the circumferential direction, and in this condition, top faces of the respective tip ends are joined by welding metal 20. In the following description, the tip end 64 of the rectangular wire piece 6B and the end portion of the rectangular wire element 6A joined at the respective top faces thereof will be referred to as a joined pair.

It should be noted that in the figure, the rectangular wire element 6A joined to one end of the rectangular wire piece 6B and the rectangular wire element 6A joined to another end of the rectangular wire piece 6B are not the same rectangular wire element 6A. In the figure, the end portion of a first rectangular wire element 6A is joined to one end of the rectangular wire piece 6B, and the end portion of a second rectangular wire element 6A passed through the same slots 5 in a position adjacent to the first rectangular wire element 6A is joined to the other end of the rectangular wire piece 6B.

Hence, the coil 3 is formed by passing four rectangular wire elements 6A through each pair of slots 5, and joining the respective end portions of four rectangular wire pieces 6B to the end portions of the four rectangular wire elements 6A projecting in the axial direction from the end face 2A. In other words, the coil 3 is constituted by four rectangular wire elements 6A, four rectangular wire pieces 6B, and eight joined pairs connecting the four rectangular wire elements 6A and four rectangular wire pieces 6B.

It should be noted that a distance between the pair of slots 5 through which the rectangular wire element 6A is passed increases toward an outer peripheral side of the stator core 2 and decreases toward an inner peripheral side. Therefore, a width of the U-shape of the rectangular wire element 6A is set in advance to be narrower in the rectangular wire elements 6A disposed closer to the radial direction inner side.

The basic structure of the coil 3 is as described above.

Next, referring to FIGS. 14-16, a rectangular wire stator coil manufacturing method according to a first embodiment of this invention will be described.

When the rectangular wire elements 6A and the rectangular wire pieces 6B are connected in succession by the procedures described above, an extremely large number of man-hours is required to complete the stator coil.

Figure 14:
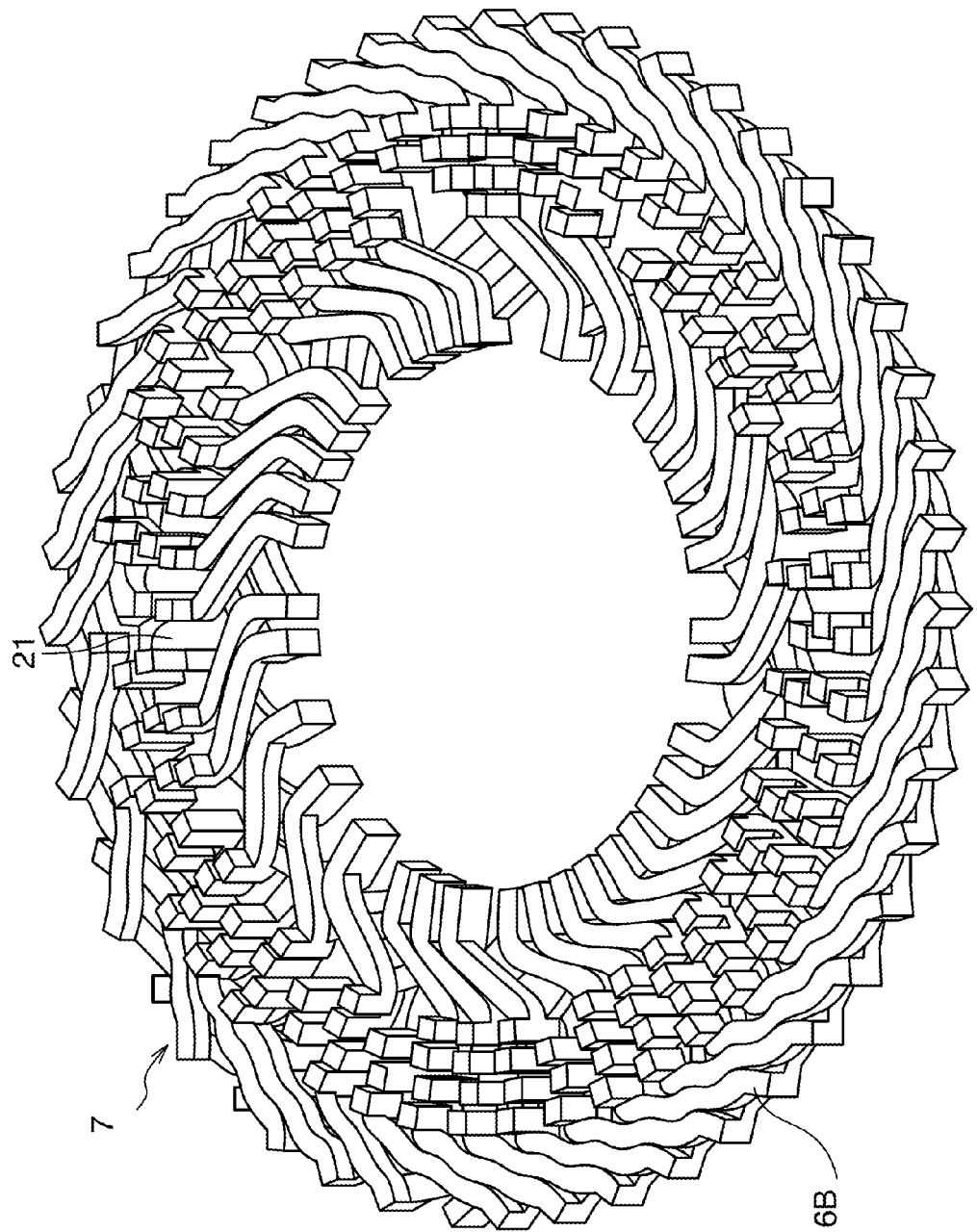
FIG. 14 is a perspective view of a sub-assembly constituted by a plurality of rectangular wire pieces.

Referring to FIG. 14, in the rectangular wire stator coil manufacturing method according to the first embodiment of this invention, all of the rectangular wire pieces 6B are disposed in advance in a predetermined overlapping condition, and integrated using resin. A sub-assembly 7 formed in this manner is then fixed to the stator core 2, in which all of the rectangular wire elements 6A have been passed through all of the slots 5, and as a result, the number of man-hours required to manufacture the stator coil can be reduced.

Figure 15:
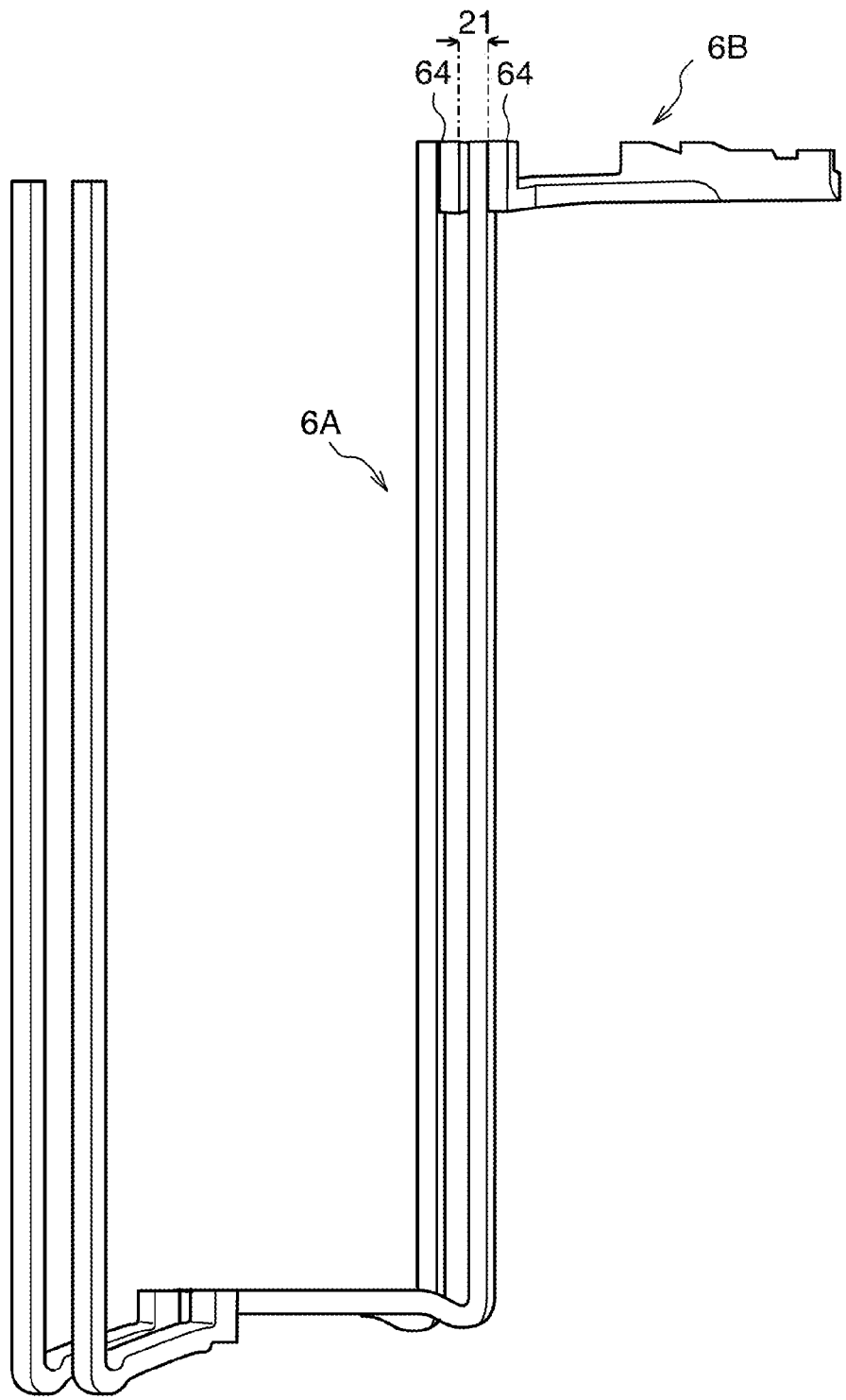
FIG. 15 is a perspective view of the rectangular wire element and the rectangular wire piece joined together.
Figure 16:
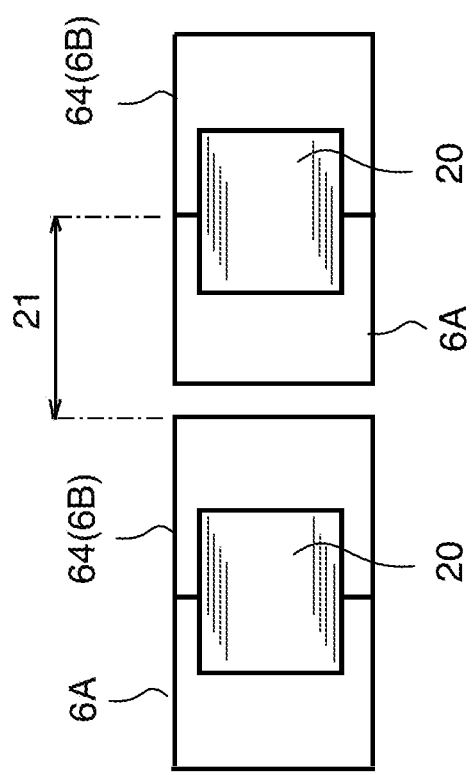
FIG. 16 is a plan view of a connecting portion between the rectangular wire element and the rectangular wire piece.

Referring to FIGS. 15 and 16, in this embodiment, the rectangular wire piece 6B is disposed in a predetermined position in advance so that the tip end 64 of the rectangular wire piece 6B and the end portion of the rectangular wire element 6A that projects in the axial direction from the second end face 2B of the stator core 2 are arranged side by side in the circumferential direction, and then the rectangular wire piece 6B is molded using resin. In this embodiment, the rectangular wire pieces 6B on the two rows on the outer side are bent in an outward direction, and the rectangular wire pieces 6B on the two rows on the inner side are bent in an inward direction. By bending the outer side rectangular wire pieces 6B in a different direction to the inner side rectangular wire pieces 6B in this manner, the number of times the rectangular wire pieces 6B are overlapped in the motor axis direction can be reduced. As a result, the length by which the coil ends of the coil 3 project in the axial direction from the second end face 2B can be further reduced.

A heat conductive resin is preferably used as the resin. Gaps 21 are formed in the resin to allow the end portions of the rectangular wire elements 6A to penetrate between the tip ends 64 of the rectangular wire pieces 6B that are adjacent thereto in the circumferential direction. More specifically, the rectangular wire pieces 6B formed into a predetermined shape are disposed inside a mold in a predetermined overlapped condition such as that shown in FIG. 14, cores for forming the gaps 21 are also disposed therein, and then the resin is poured into the mold. As a result, the rectangular wire pieces 6B are fixed to each other in predetermined positions by the resin. Further, by removing the cores after the resin has hardened, the gaps 21 are formed to allow the end portions of the rectangular wire elements 6A to penetrate between the tip ends 64 of the rectangular wire pieces 6B that are bent outward in the axial direction.

The sub-assembly 7 formed in this manner is fitted to the stator core 2, in which all of the rectangular wire elements 6A have been passed through the slots 5. At this time, the end portions of the rectangular wire elements 6A projecting in the axial direction from the second end face 2B of the stator core 2 are inserted respectively into the gaps 21 in the sub-assembly 7.

Referring back to FIGS. 15 and 16, when the end portions of the rectangular wire elements 6A are inserted into the gaps 21 in the sub-assembly 7, the end portions project so as to be arranged side by side with the tip ends 64 of the rectangular wire pieces 6B in the circumferential direction. In this condition, as shown in FIG. 16, the top face of the end portion of the rectangular wire element 6A and the top face of the tip end 64 of the rectangular wire piece 6B are joined to each other fixedly. More specifically, the welding metal 20 is welded thereto from above so as to straddle the two top faces. The joining operations that are performed between the adjacent rectangular wire elements 6A and rectangular wire pieces 6B may be implemented in parallel simultaneously using a dedicated joining machine, for example, such as a laser welder, a brazing machine, or the like, for example. In so doing, the number of man-hours required for the operation to wind the coils 3 can be greatly reduced. The rectangular wire elements 6A are joined closely to the tip ends 64 of the rectangular wire pieces 6B, and therefore, as shown in FIG. 16, a gap is formed between the rectangular wire element 6A and the tip end 64 of another rectangular wire piece 6B located on the opposite side. This gap is desirable since it prevents electric short circuits from occurring between adjacent windings.

As shown in FIGS. 1A and 1B, as a result of the joining operations, all of the coils 3 are wound.

To reduce the number of man-hours required for the operation to wind the coils 3, the rectangular wire elements 6A can be assembled in advance into a unit such as that described below and inserted into the stator core 2 altogether in the form of the unit. As a result, an operation to manufacture the stator 1 can be performed more easily.

Figure 9:
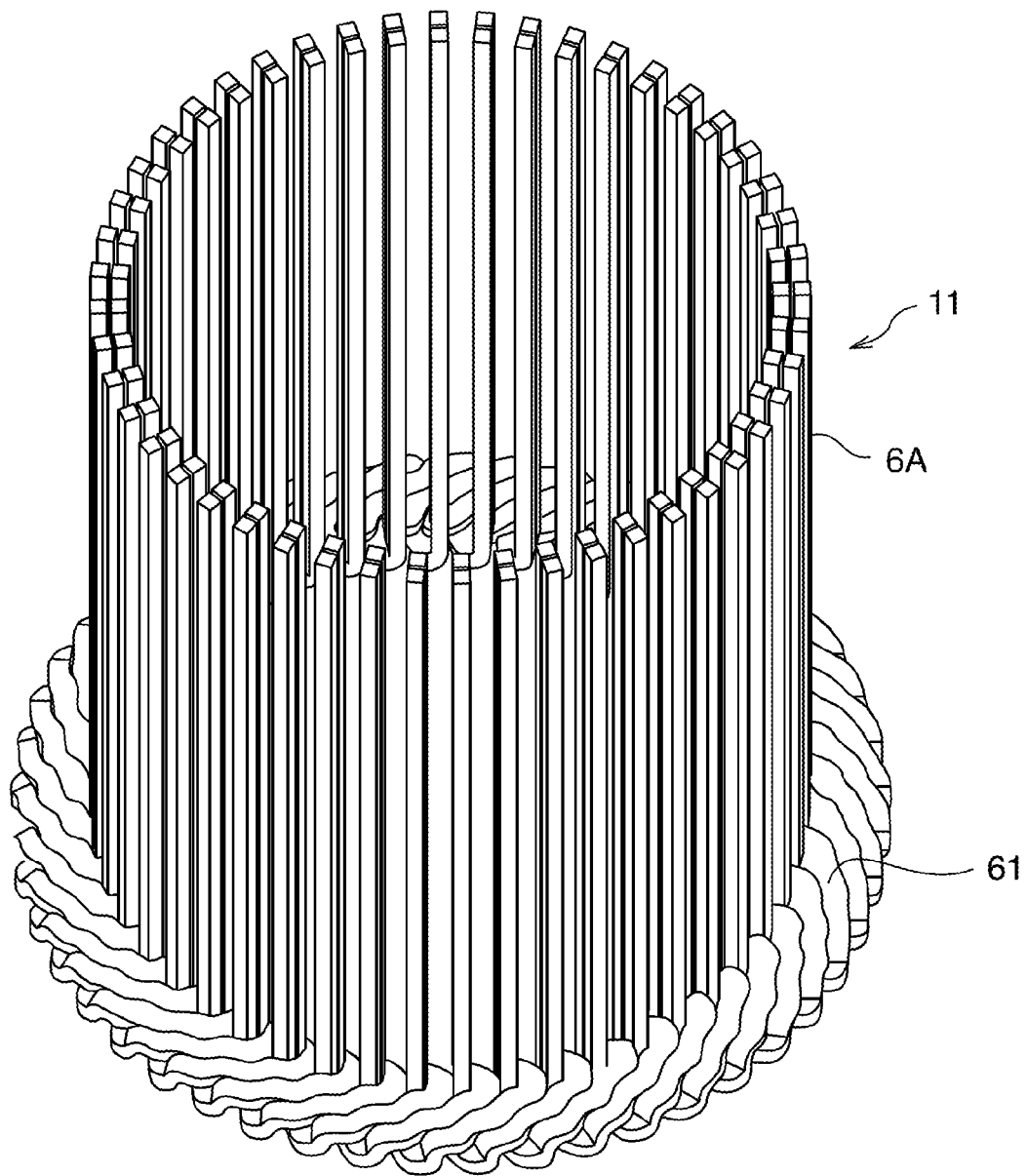
FIG. 9 is a perspective view of an inner side rectangular wire unit formed by assembling two rows of inner side rectangular wire elements.

Referring to FIG. 9, the two inner side windings of the rectangular wire element 6A wound four times so as to overlap in the radial direction within the slot 5 are assembled into an inner side rectangular wire unit 11 using the rectangular wire element 6A.

Figure 10:
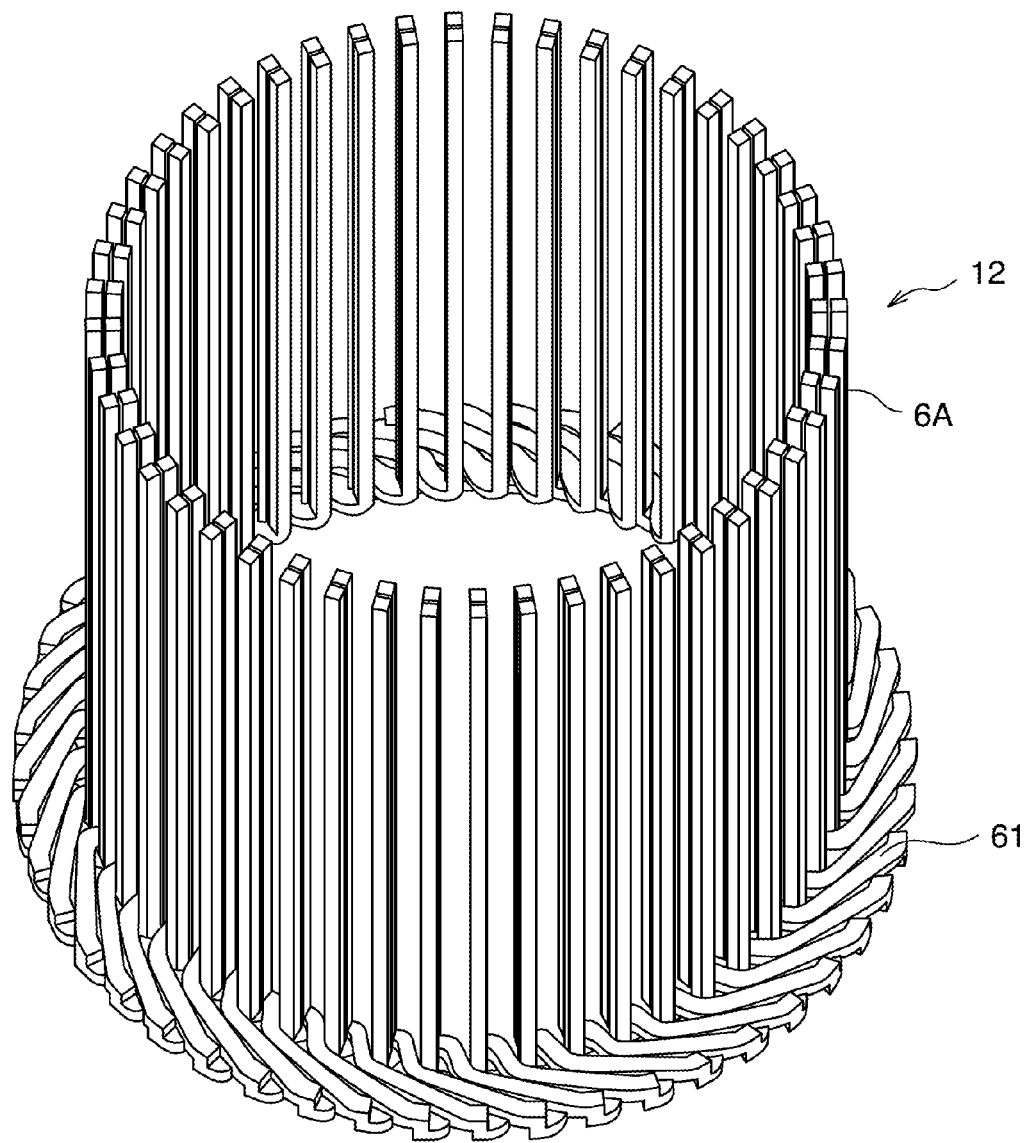
FIG. 10 is a perspective view of an outer side rectangular wire unit formed by assembling two rows of outer side rectangular wire elements.

Referring to FIG. 10, the two outer side windings are assembled into an outer side rectangular wire unit 12 using the rectangular wire element 6A shown in FIG. 5.

The overlapping bent portions 61 of the assembled inner side rectangular wire unit 11 and outer side rectangular wire unit 12 are fixed by resin so that the inner side rectangular wire unit 11 and outer side rectangular wire unit 12 can support themselves.

Figure 11:
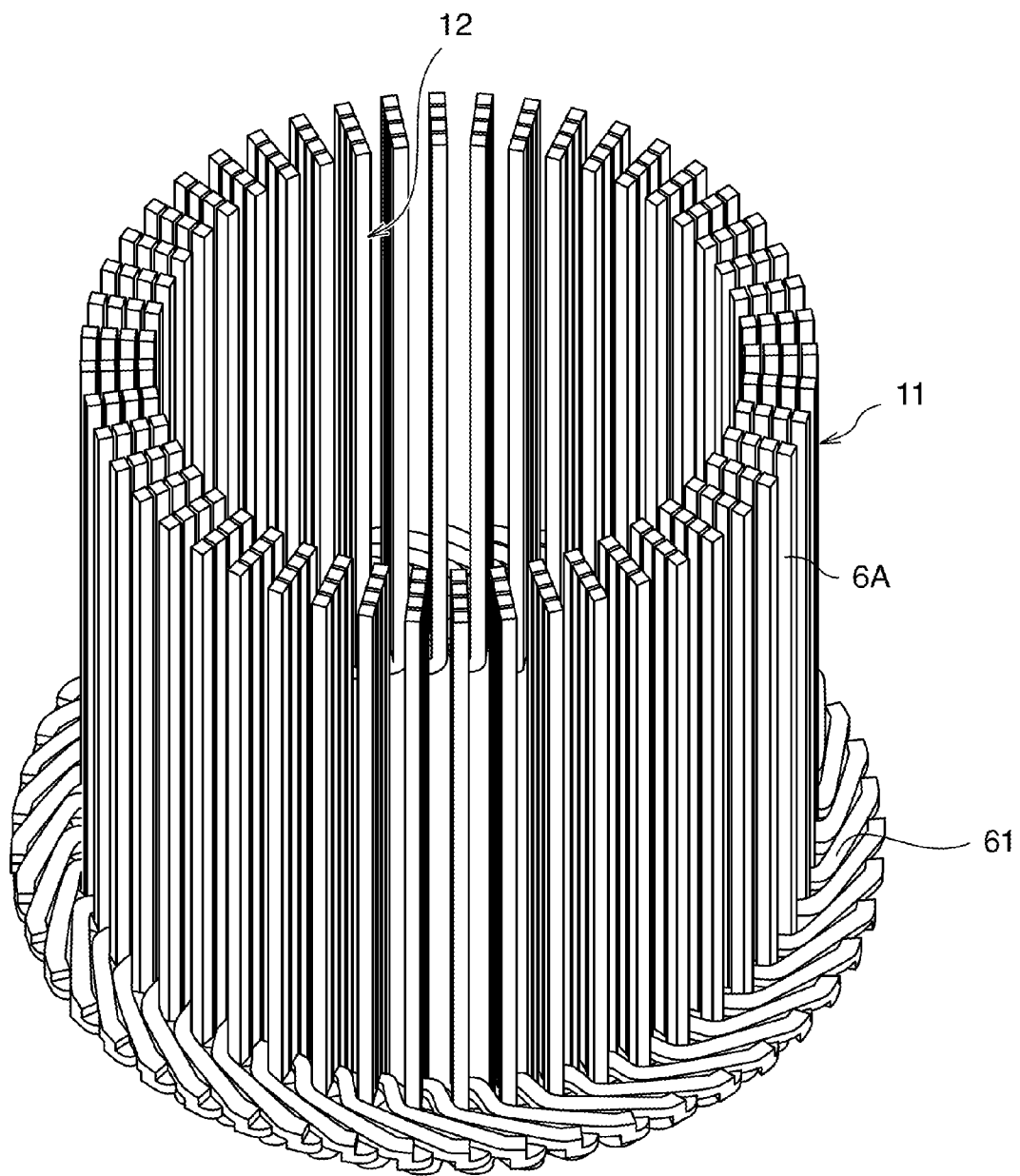
FIG. 11 is a perspective view of a rectangular wire unit formed by combining the inner side rectangular wire unit and the outer side rectangular wire unit.

Referring to FIG. 11, the inner side rectangular wire unit 11 thus assembled is inserted from the axial direction into the inner side of the outer side rectangular wire unit 12, whereby the four rows of rectangular wire elements 6A are all assembled into a single rectangular wire unit. The rectangular wire unit is then inserted in a single operation into the slots 5 in the stator core 2.

Figure 13:
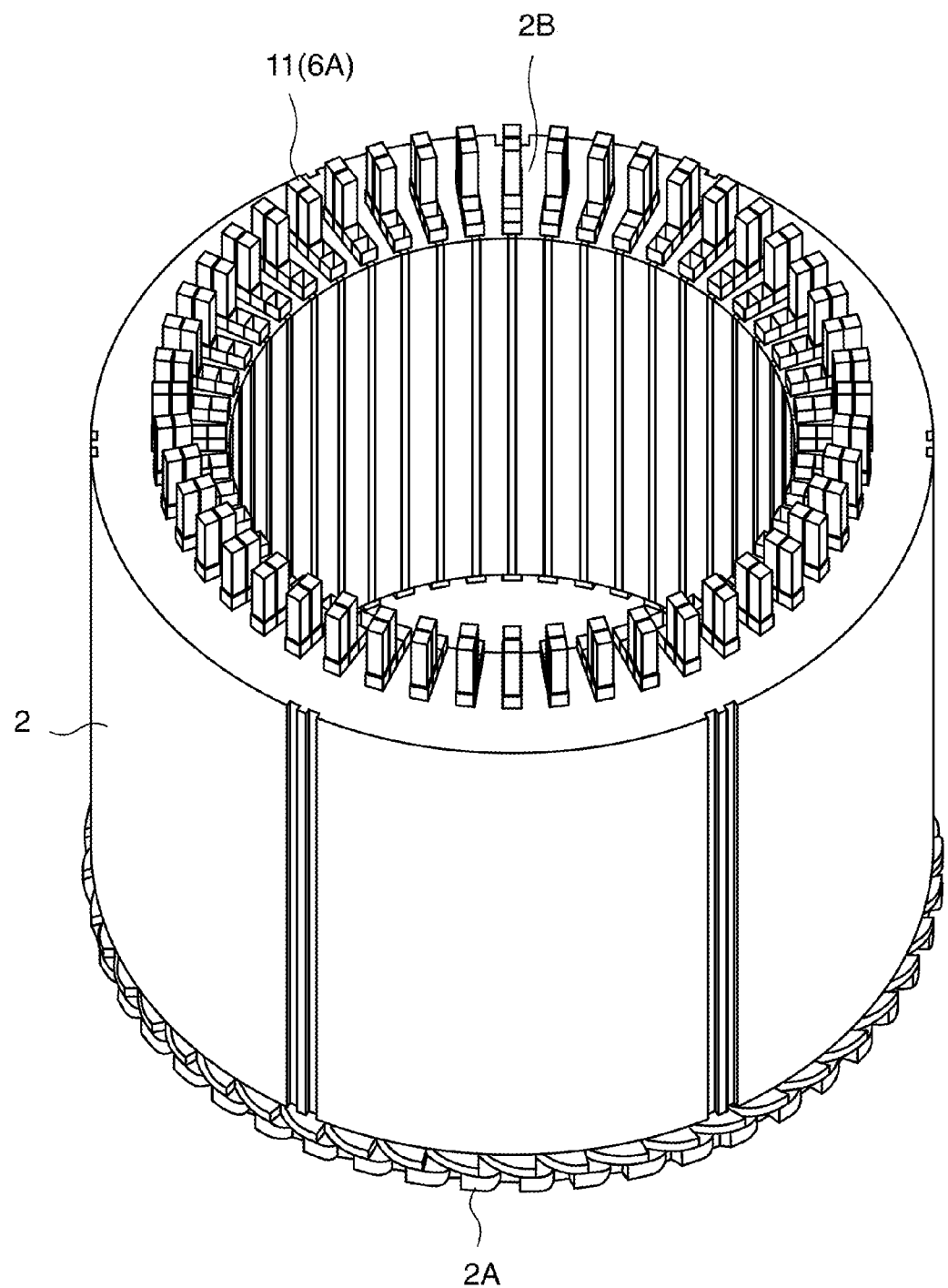
FIG. 13 is a perspective view of the outer side rectangular wire unit inserted into the stator core.

Referring to FIG. 13, in another method, the outer side rectangular wire unit 12 alone may be inserted into the slots 5 first, whereupon the inner side rectangular wire unit 11 is inserted into the slots 5 on the inner side of the outer side rectangular wire unit 12.

By likewise forming the rectangular wire elements 6A into a unit in this manner, the number of man-hours required for the operation to manufacture the stator coil can be reduced even further.

The bent portions 61 of the rectangular wire elements 6A are preferably bent in opposite directions in the inner side rectangular wire unit 11 and the outer side rectangular wire unit 12. More specifically, the bent portions 61 of the inner side rectangular wire unit 11 are bent radially inward, and the bent portions 61 the outer side rectangular wire unit 12 are bent radially outward. By bending the bent portions 61 of the inner side rectangular wire unit 11 and the outer side rectangular wire unit 12 in opposite directions in this manner, the bent portions 61 of the inner side rectangular wire unit 11 and the bent portions 61 of the outer side rectangular wire unit 12 no longer overlap in the motor axis direction, and therefore the length by which the coil ends formed by the rectangular wire elements 6A project in the axial direction can be reduced even further.

As described above, with the rectangular wire stator coil manufacturing method according to the first embodiment of this invention, the plurality of rectangular wire pieces 6B are integrated into the sub-assembly 7 in advance, and therefore the number of man-hours required to wind the coils 3 can be reduced. Further, the length by which the coil ends on one side of the stator coil project in the axial direction is reduced by forming the bent portions 63 on the rectangular wire pieces 6B, and the length by which the coil ends on the other side of the stator coil project in the axial direction is reduced by forming the bent portions 61 on the rectangular wire elements 6A.

Furthermore, by forming the bent portions 63 of the rectangular wire pieces 6B from bent portions that bend both outward and inward relative to the radial direction, the number of times the bent portions 63 overlap can be reduced.

Moreover, by employing a heat conductive resin in the sub-assembly 7, a heat dissipation property of the coil 3 can be improved.

Next, other embodiments of this invention relating to methods of connecting the rectangular wire element 6A to the rectangular wire piece 6B will be described.

Figure 17B:
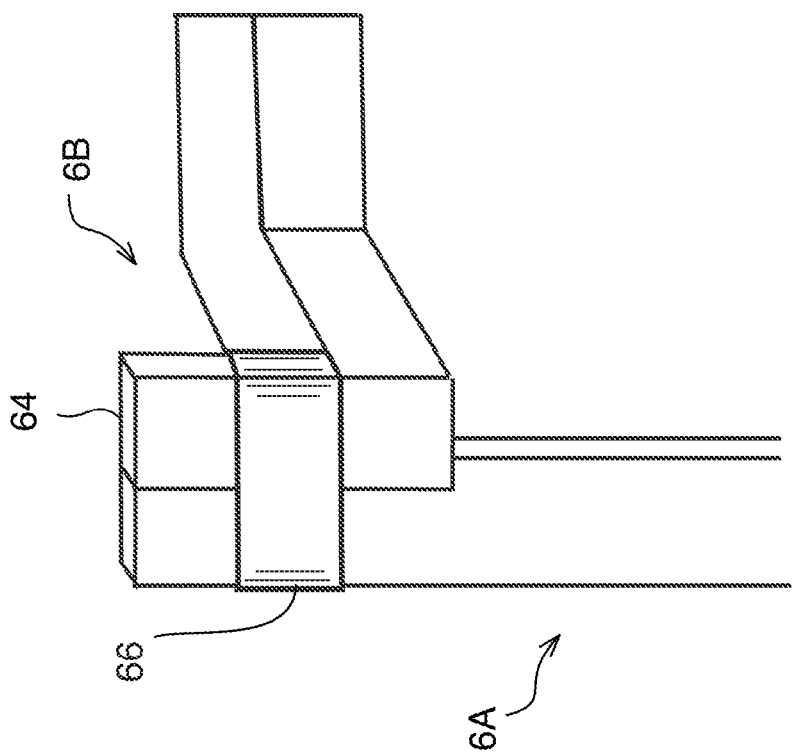
FIGS. 17A and 17B are perspective views of a connecting portion between a rectangular wire element and a rectangular wire piece according to a second embodiment of this invention.
Figure 17A:
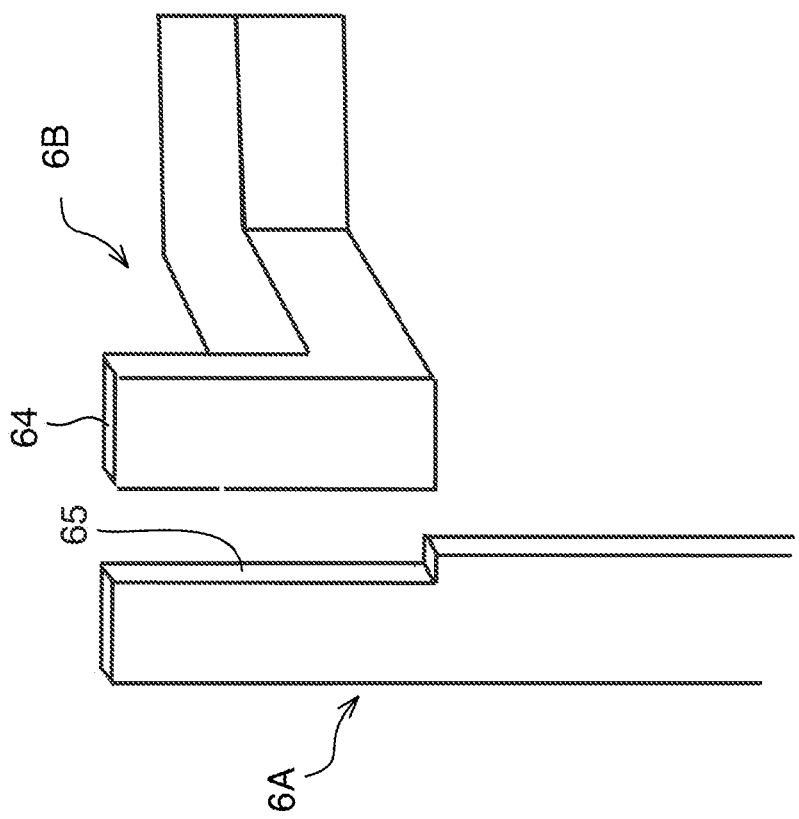

Referring to FIGS. 17A and 17B, a method of connecting the rectangular wire element 6A and the rectangular wire piece 6B according to a second embodiment of this invention will be described.

In this embodiment, a cutout 65 is formed in advance in the end portion of the rectangular wire element 6A. Then, before joining the end portion of the rectangular wire element 6A to the tip end 64 of the rectangular wire piece 6B, the tip end 64 of the rectangular wire piece 6B is engaged with the cutout 65, and in this condition, the end portion of the rectangular wire element 6A and the tip end 64 of the rectangular wire piece 6B are fixed by a binding member 66 constituted by an electric insulating material. As shown in FIG. 16, with the end portion of the rectangular wire element 6A and the tip end 64 of the rectangular wire piece 6B bound integrally in this manner, the top face of the end portion of the rectangular wire element 6A and the top face of the tip end 64 of the rectangular wire piece 6B are joined using the welding metal 20.

According to this embodiment, the end portion of the rectangular wire element 6A and the tip end 64 of the rectangular wire piece 6B can be joined even more closely. As a result, a larger gap can be secured between the tip end 64 of the rectangular wire piece 6B bound by the binding member 66 and the tip end of another rectangular wire element 6A bound by a different binding member 66 that is adjacent thereto in the circumferential direction. As a result, electric short circuits between adjacent windings of the coils 3 can be prevented even more reliably.

The binding member 66 may be constituted by a tape-form member that is wound around the end portion of the rectangular wire element 6A and the tip end 64 of the rectangular wire piece 6B, or by a rigid member that fixes the end portion of the rectangular wire element 6A and the tip end 64 of the rectangular wire piece 6B to each other by caulking.

Figure 18B:
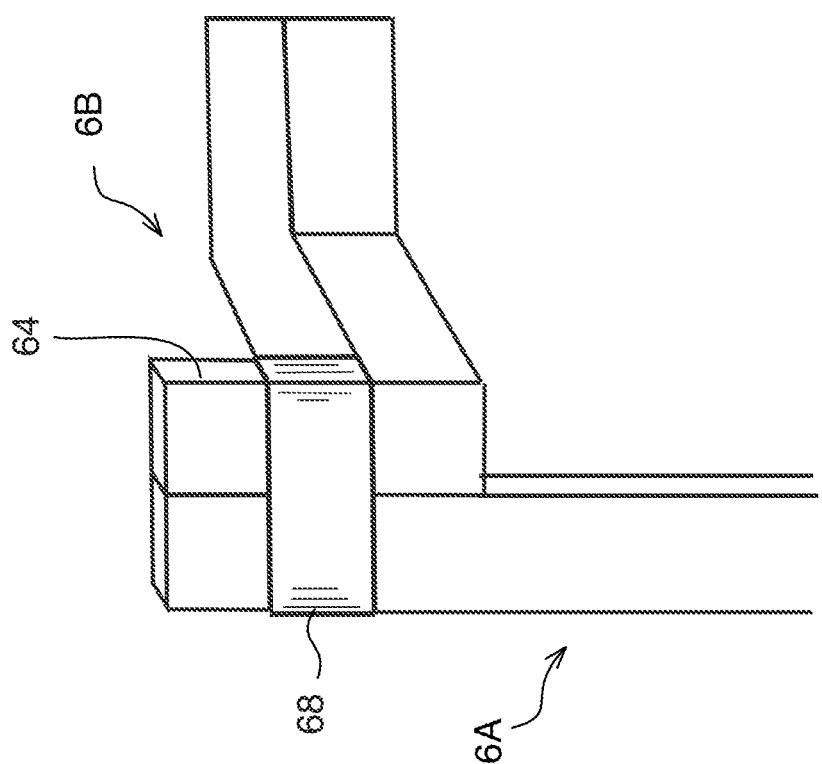
FIGS. 18A and 18B are perspective views of a connecting portion between a rectangular wire element and a rectangular wire piece according to a third embodiment of this invention.
Figure 18A:
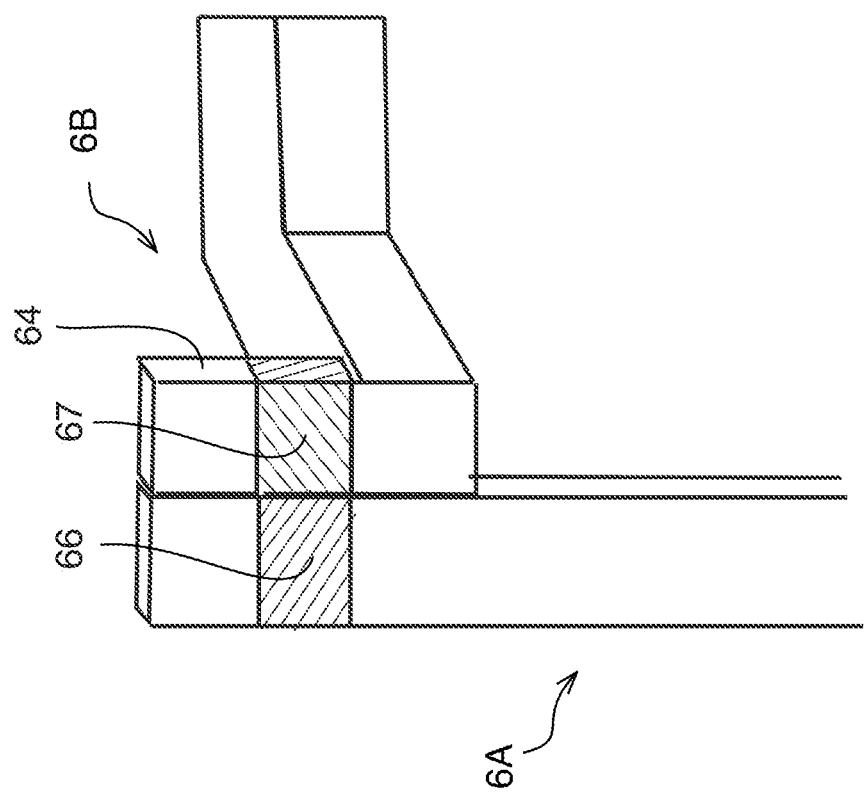

Referring to FIGS. 18A and 18B, a method of joining the rectangular wire element 6A and the rectangular wire piece 6B according to a third embodiment of this invention will be described.

In this embodiment, copper wire exposed portions 66 and 67 are formed in advance by cutting away the insulating material in the shape of a strip from a part of the end portion of the rectangular wire element 6A and a part of the tip end 64 of the rectangular wire piece 6B. The exposed portions 66 and 67 are then placed adjacent to each other, and in this condition, the end portion of the rectangular wire element 6A and the tip end 64 of the rectangular wire piece 6B are fixed to each other by a binding member 68 constituted by a conductive material. As shown in FIG. 16, with the end portion of the rectangular wire element 6A and the tip end 64 of the rectangular wire piece 6B bound integrally in this manner, the top face of the end portion of the rectangular wire element 6A and the top face of the tip end 64 of the rectangular wire piece 6B are joined using the welding metal 20.

According to this embodiment, it is possible to secure a perfect electrical connection between the rectangular wire element 6A and the rectangular wire piece 6B. Meanwhile, the binding member 68 binds the tip end 64 of the rectangular wire piece 6B closely to the end portion of the rectangular wire element 6A, and therefore a gap can be secured between adjacent joined pairs in the circumferential direction, or in other words adjacent windings in the circumferential direction. As a result, electric short circuits between the windings of the coil 3 can be prevented. It should be noted that in order to prevent electric short circuits between the windings completely, the binding member 68 is preferably formed with a laminated structure in which a surface of the binding member 68 that contacts the exposed portions 66 and 67 is formed from a conductive material and a surface of the binding member 68 that is exposed to the outside is constituted by an insulating material.

Figure 19B:
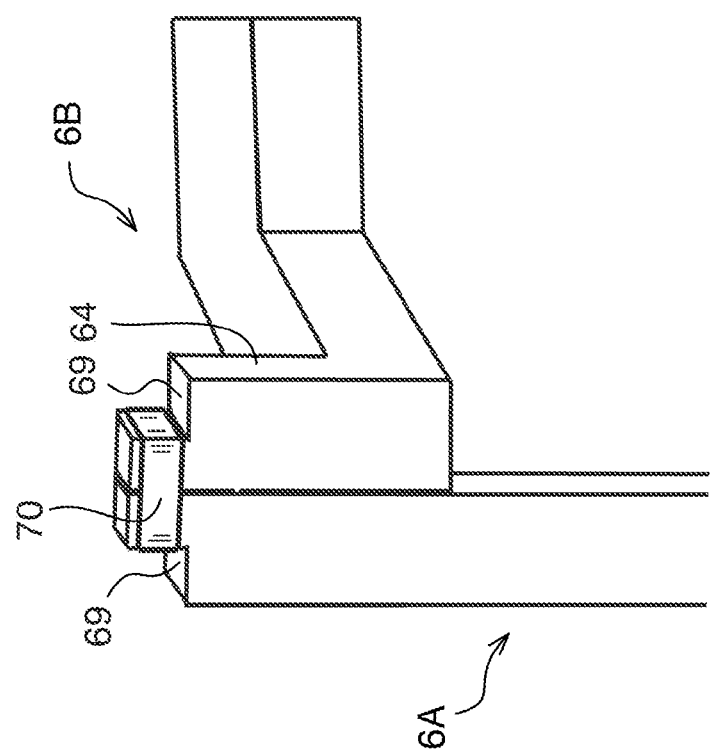
FIGS. 19A and 19B are perspective views of a connecting portion between a rectangular wire element and a rectangular wire piece according to a fourth embodiment of this invention.
Figure 19A:
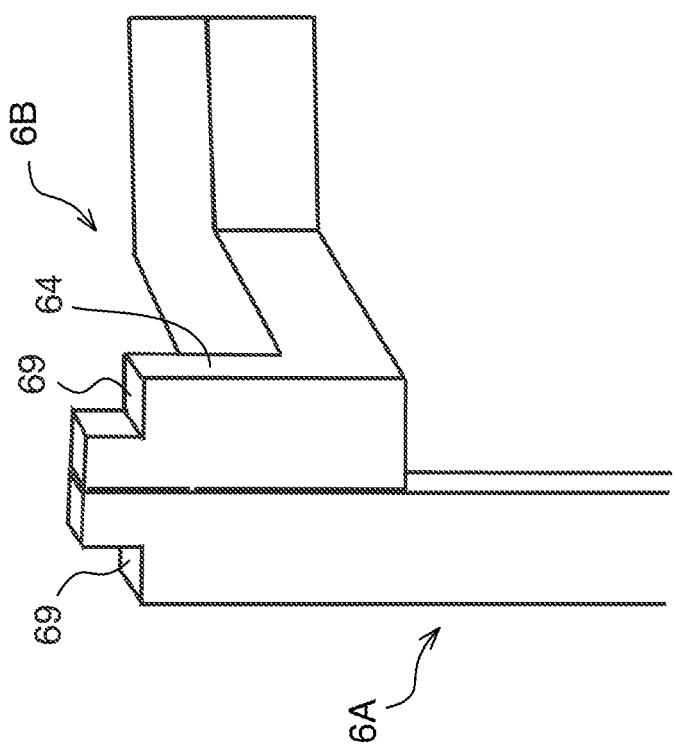

Referring to FIGS. 19A and 19B, a method of joining the rectangular wire element 6A and the rectangular wire piece 6B according to a fourth embodiment of this invention will be described.

In this embodiment, small cutouts 69 are formed in advance respectively in the end portion of the rectangular wire element 6A and the tip end 64 of the rectangular wire piece 6B. The cutouts 69 are not formed in mutually contacting parts of the end portion of the rectangular wire element 6A and the tip end 64 of the rectangular wire piece 6B.

With the end portion of the rectangular wire element 6A and the tip end 64 of the rectangular wire piece 6B in contact with each other, the end portion of the rectangular wire element 6A and the tip end 64 of the rectangular wire piece 6B, the respective cross-sections of which having been reduced by the cutouts 69, are fixed by a binding member 70 constituted by an electric insulating material. With the end portion of the rectangular wire element 6A and the tip end 64 of the rectangular wire piece 6B bound integrally in this manner, the top face of the end portion of the rectangular wire element 6A and the top face of the tip end 64 of the rectangular wire piece 6B are joined using the welding metal 20.

Likewise according to this embodiment, the end portion of the rectangular wire element 6A and the tip end 64 of the rectangular wire piece 6B are joined to each other closely so that a gap is secured between adjacent windings, and therefore electric short circuits can be prevented from occurring between the windings of the coils 3. Further, the binding member 70 can be used in a smaller amount than in the second and third embodiments. Moreover, the binding member 70 binds the rectangular wire element 6A and the rectangular wire piece 6B further toward the tip end side than in the second and third embodiments, and therefore the binding member 70 can be applied more easily.

Referring to FIGS. 20A-20C, variation in the shapes of the end portion of the rectangular wire element 6A and the tip end 64 of the rectangular wire piece 6B will be described.

Similarly to the fourth embodiment, the small cutouts 69 are formed in advance in the end portion of the rectangular wire element 6A and the tip end 64 of the rectangular wire piece 6B shown in FIG. 20A. Regardless of whether or not the binding member 70 is applied, this tip end shape is favorable in terms of securing sufficient space for disposing members and securing a heat dissipation property.

In FIG. 20B, tapered portions 70 are formed on a part of the end portion of the rectangular wire element 6A and the tip end 64 of the rectangular wire piece 6B instead of the cutouts 69. Likewise with the tapered portions 70, similar favorable effects to those of the cutouts 69 are obtained in terms of securing sufficient space for disposing members and securing a heat dissipation property.

In FIG. 20C, conical portions 71 are formed on a part of the end portion of the rectangular wire element 6A and the tip end 64 of the rectangular wire piece 6B instead of the cutouts 69. Likewise with the conical portions 71, similar favorable effects to those of the cutouts 69 are obtained in terms of securing sufficient space for disposing members and securing a heat dissipation property.

These tip ends are pointed. Even when pointed tip ends are employed, flat top faces 72 are still secured respectively on the end portion of the rectangular wire element 6A and the tip end 64 of the rectangular wire piece 6B. As shown in FIGS. 21A-21C, the end portion of the rectangular wire element 6A and the tip end 64 of the rectangular wire piece 6B are joined at the remaining top faces 72 using the welding metal 20.

Figure 22A:
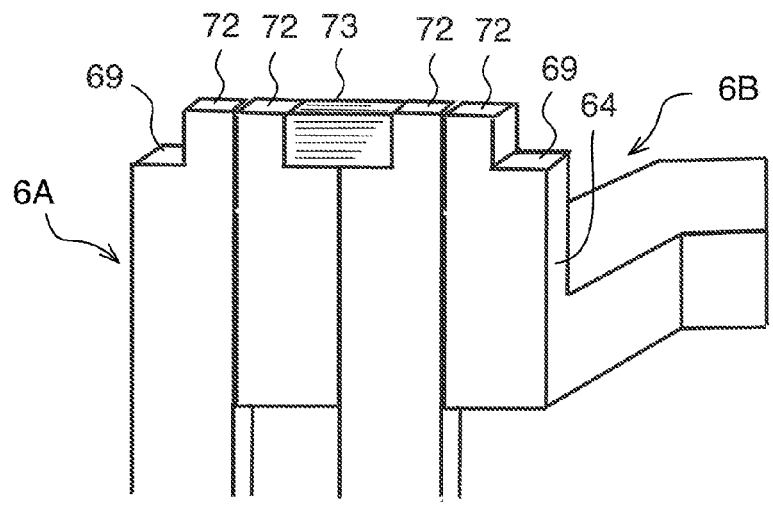
FIGS. 22A-22C are perspective views of two connecting portions between adjacent rectangular wire elements and rectangular wire pieces, illustrating an arrangement of an insulating member.
Figure 22B:
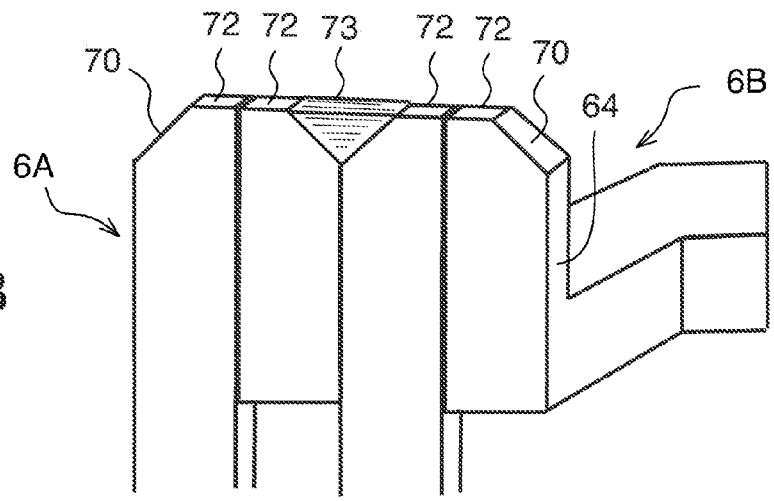
Figure 22C:
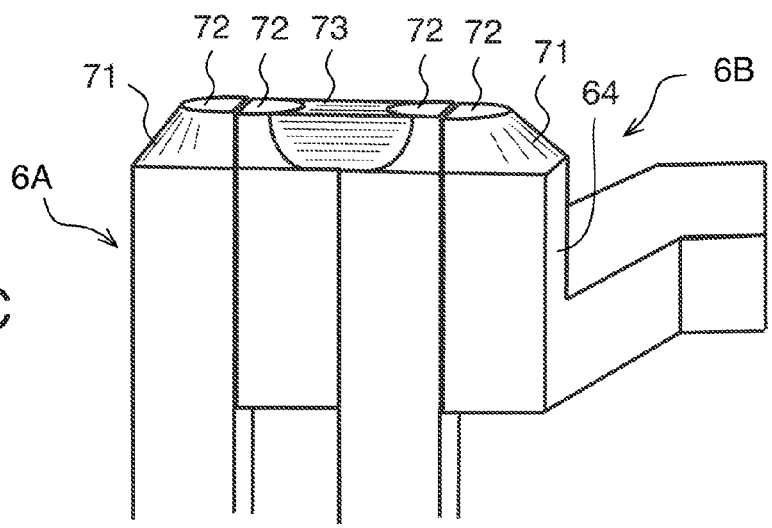

Further, as shown in FIGS. 22A-22C, by interposing an insulating member 73 between the small cutout 69, tapered portion 70, or conical portion 71 described above and the small cutout 69, tapered portion 70, or conical portion 71 of the winding that is adjacent thereto in the circumferential direction, a gap can be secured between adjacent windings.

Figure 23:
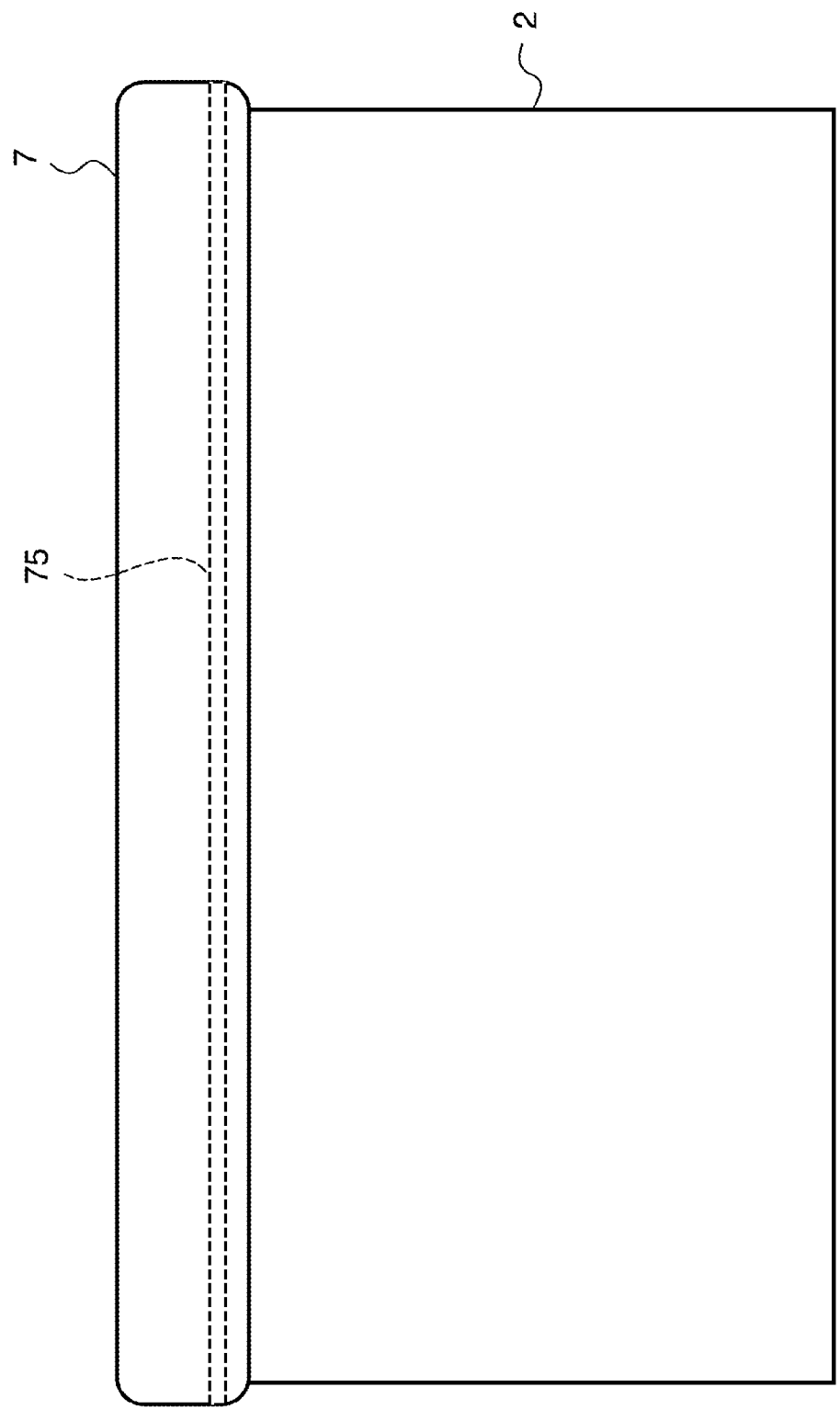
FIG. 23 is a side view of the stator core and the sub-assembly, illustrating an arrangement of a coolant passage.

Referring to FIG. 23, a coolant passage 75 may be formed in advance in the resin part of the sub-assembly 7. By circulating a coolant through the coolant passage 75, the stator 1 can be cooled while operative.

Figure 24:
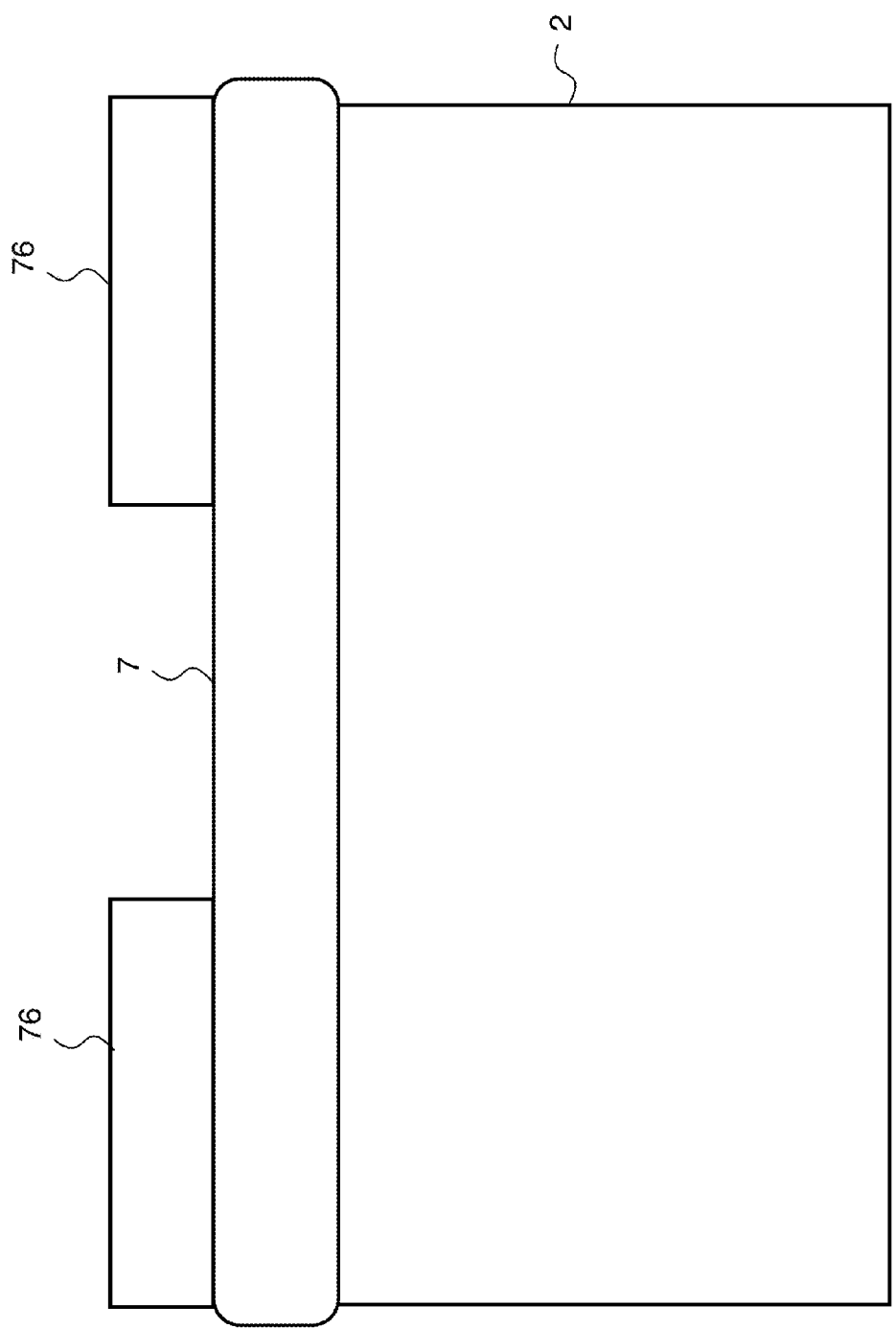
FIG. 24 is a side view of the stator core and the sub-assembly, illustrating an arrangement of a heat radiation fin.

Referring to FIG. 24, to promote cooling of the stator 1 when the stator 1 is operative, heat radiation fins 76 are preferably formed on the sub-assembly 7 so as to be oriented axially outward.

Referring to FIG. 25, when the gap 21 is formed in the sub-assembly 7, a diameter of the gap 21 may be narrowed gradually toward the axial direction outer side. Here, the axial direction outer side corresponds to the upper side of FIG. 3 and FIG. 24. In FIG. 25, the end portion of the rectangular wire element 6A penetrates the gap 21 upwardly from below. By narrowing the diameter of the gap 21 upwardly in this manner, the gap 21 itself functions as a guide for guiding the end portion of the rectangular wire element 6A. As a result, the end portion of the rectangular wire element 6A, which projects toward the axial direction outer side from the gap 21, can be positioned accurately.

Although the invention has been described above with reference to certain embodiments, the invention is not limited to the embodiments described above. Modifications and variations of the embodiments described above will occur to those skilled in the art, within the scope of the claims.

INDUSTRIAL APPLICABILITY

As described above, with this invention, an increase in the length by which a coil end of a stator coil projects in an axial direction is suppressed, and a number of man-hours required for an operation to wind a coil onto a stator core is reduced. Therefore, this invention brings about favorable effects in terms of size reduction and production rationalization in an electric motor for a vehicle, for example.

The embodiments of this invention in which an exclusive property or privilege is claimed are defined as follows:

The invention claimed is:

1. A rectangular wire stator coil manufacturing method for winding a rectangular wire on a stator core, the stator core having a first end face, a second end face, a plurality of teeth extending between the first and second end faces, and a plurality of slots each of which is formed between adjacent teeth, the method comprising:
  forming in advance a plurality of rectangular wire elements by cutting the rectangular wire to a predetermined length and bending into a substantial U-shape;
  forming in advance a plurality of rectangular wire pieces configured to connect predetermined pairs of end portions of the rectangular wire elements as a sub-assembly;
  inserting each of the rectangular wire elements into a predetermined pair of the slots of the stator core from the first end face and causing the end portions of the rectangular wire elements to project from the second end face;
  fitting the sub-assembly to the second end face by fixing the rectangular wire pieces to the predetermined pairs of the end portions of the rectangular wire elements that project from the second end face;
  forming a first group of the rectangular wire elements each of which has a bent portion bent radially inward along the first end face; and
  forming a second group of the rectangular wire elements each of which has a bent portion bent radially outward along the first end face.

2. The rectangular wire stator coil manufacturing method according to claim 1, further comprising:
  disposing the first group of the rectangular wire elements on a radially inner side of the second group of the rectangular wire elements.

3. The rectangular wire stator coil manufacturing method according to claim 1, further comprising:
  forming each of the rectangular wire pieces to have a bent portion bent along the second end face.

4. The rectangular wire stator coil manufacturing method according to claim 1, wherein fixing the rectangular wire pieces to the predetermined pairs of the end portions of the rectangular wire elements includes binding an end portion of a rectangular wire element and a tip end of a rectangular wire piece together by a binding member.

5. The rectangular wire stator coil manufacturing method according to claim 1, further comprising:

forming the sub-assembly from the plurality of the rectangular wire pieces and a heat conductive resin that holds the plurality of the rectangular wire pieces in predetermined positions.

6. The rectangular wire stator coil manufacturing method according to claim 5, further comprising:

forming the sub-assembly to have a coolant passage within a portion made of the heat conductive resin.

7. The rectangular wire stator coil manufacturing method according to claim 5, further comprising:

forming the sub-assembly to have a heat radiation fin made of the heat conductive resin.

8. The rectangular wire stator coil manufacturing method according to claim 1, further comprising:

forming both the end portions of the rectangular wire elements and tip ends of the rectangular wire pieces into a convergent shape toward a leading end.

9. The rectangular wire stator coil manufacturing method according to claim 1, further comprising:

forming a cutout in one of an end portion of a rectangular wire element and a tip end of a rectangular wire piece to accept another of the end portion and the tip end.

10. A rectangular wire stator coil manufacturing method for winding a rectangular wire on a stator core, the stator core having a first end face, a second end face, a plurality of teeth extending between the first and second end faces, and a plurality of slots each of which is formed between adjacent teeth, the method comprising:

forming in advance a plurality of rectangular wire elements by cutting the rectangular wire to a predetermined length and bending into a substantial U-shape;

forming in advance a plurality of rectangular wire pieces configured to connect predetermined pairs of end portions of the rectangular wire elements as a sub-assembly;

inserting each of the rectangular wire elements into a predetermined pair of the slots of the stator core from the first end face and causing the end portions of the rectangular wire elements to project from the second end face; and fitting the sub-assembly to the second end face by fixing the rectangular wire pieces to the predetermined pairs of the end portions of the rectangular wire elements that project from the second end face, wherein fixing the rectangular wire pieces to the predetermined pairs of the end portions of the rectangular wire elements includes binding an end portion of a rectangular wire element and a tip end of a rectangular wire piece together by a binding member.

\* \* \* \* \*